United States Patent
Greenwell et al.

(10) Patent No.: US 11,292,093 B2
(45) Date of Patent: Apr. 5, 2022

(54) MULTI-JACK TENSIONERS

(71) Applicant: SUPERBOLT, INC., Carnegie, PA (US)

(72) Inventors: Steven Greenwell, Ontario (CA); William Myers, Jefferson Hills, PA (US); Adam Glenn Lutty, Cranberry Township, PA (US)

(73) Assignee: SUPERBOLT, INC., Carnegie, PA (US)

( * ) Notice: Subject to any disclaimer, the term of this patent is extended or adjusted under 35 U.S.C. 154(b) by 112 days.

(21) Appl. No.: 16/310,528

(22) PCT Filed: Jun. 16, 2017

(86) PCT No.: PCT/US2017/037834
§ 371 (c)(1),
(2) Date: Dec. 17, 2018

(87) PCT Pub. No.: WO2017/218870
PCT Pub. Date: Dec. 21, 2017

(65) Prior Publication Data
US 2019/0321927 A1    Oct. 24, 2019

Related U.S. Application Data

(60) Provisional application No. 62/350,787, filed on Jun. 16, 2016.

(51) Int. Cl.
*B23P 19/06* (2006.01)
*F16B 31/04* (2006.01)
*F16D 1/033* (2006.01)

(52) U.S. Cl.
CPC ............ *B23P 19/067* (2013.01); *F16B 31/04* (2013.01); *F16D 1/033* (2013.01)

(58) Field of Classification Search
CPC ......... F16B 31/04; B25B 29/02; B23P 19/067
(Continued)

(56) References Cited

U.S. PATENT DOCUMENTS 3,154,006 A * 10/1964 Novak ................ F16B 43/00
29/452
3,285,568 A * 11/1966 Biach ................ F16B 31/043
254/29 A
(Continued)

FOREIGN PATENT DOCUMENTS

EP       0695883 A1   2/1996
GB       1277610      6/1972
(Continued)

OTHER PUBLICATIONS

International Search Report for corresponding application PCT/US2017/037834 filed Jun. 16, 2017; dated Oct. 6, 2017.
(Continued)

*Primary Examiner* — Jacob J Cigna
*Assistant Examiner* — Michael W Hotchkiss
(74) *Attorney, Agent, or Firm* — Cantor Colburn LLP

(57) ABSTRACT

A multi jack tensioner including: a body portion formed to engage an elongate fastening member or integrally formed therewith; a load bearing member for applying force to a workpiece to be fastened and arranged for location about said fastening member adjacent the body portion; a pressure chamber between the load bearing member and the body portion arranged to displace the body portion from the load bearing member in response to hydraulic pressure; and a plurality of jack bolts extending between the body portion and the load bearing member for further displacing the body portion from the load bearing member; wherein application of hydraulic pressure to the hydraulic chamber displaces the body portion from the load bearing member for tensioning
(Continued)

said fastening member and whereby subsequent tensioning of the fastening member is applied by operation of the jack bolts.

19 Claims, 31 Drawing Sheets

(58) Field of Classification Search
   USPC .......................................... 411/434, 917, 916
   See application file for complete search history.

(56) References Cited

U.S. PATENT DOCUMENTS

| | | | | |
|---|---|---|---|---|
| 3,424,080 A * | 1/1969 | Pappas | ................. | F16B 31/043 100/214 |
| 3,462,180 A * | 8/1969 | Bunyan | ................. | F16B 31/043 403/40 |
| 3,722,332 A * | 3/1973 | Jones | ................. | B25B 29/02 81/57.38 |
| 4,224,843 A * | 9/1980 | Heiermann | ........... | B23P 19/067 81/57.38 |
| 4,338,037 A * | 7/1982 | Deminski | ........... | F04B 39/0022 403/24 |
| 4,569,506 A | 2/1986 | Vassalotti | | |
| 4,622,730 A * | 11/1986 | Steinbock | ............. | B21B 27/035 403/320 |
| 4,773,146 A * | 9/1988 | Bunyan | ................. | B23P 19/067 29/407.02 |
| 4,846,444 A * | 7/1989 | Vassalotti | ............. | B23P 19/067 254/29 A |
| 4,854,798 A * | 8/1989 | Snyder | ................. | F16B 31/043 411/434 |
| 4,927,305 A | 5/1990 | Peterson | | |
| RE33,490 E | 12/1990 | Steinbock | | |
| 5,013,199 A * | 5/1991 | Downes | ................. | F16B 31/04 267/161 |
| 5,046,906 A * | 9/1991 | Bucknell | ................. | B25B 29/02 411/432 |
| 5,075,950 A * | 12/1991 | Steinbock | ............... | F16B 31/04 29/426.5 |
| 5,083,889 A * | 1/1992 | Steinbock | ............. | B21B 27/035 403/320 |
| 5,452,629 A * | 9/1995 | Heiermann | ........... | B23P 19/067 81/57.38 |
| 5,527,015 A * | 6/1996 | Percival-Smith | ..... | B23P 19/067 254/29 A |
| 5,846,042 A * | 12/1998 | Iannuzzi | ................. | F16D 11/14 411/120 |
| 6,112,396 A | 9/2000 | Steinbock | | |
| 6,263,764 B1 * | 7/2001 | Steinbock | ............. | B23P 19/067 29/452 |
| 6,763,570 B2 * | 7/2004 | Abbott | ................. | G21C 13/073 29/525.01 |
| 6,938,450 B1 * | 9/2005 | Zhang | ................... | B30B 15/045 100/214 |
| 7,008,156 B2 * | 3/2006 | Imai | ......................... | F16B 2/16 411/14.5 |
| 7,637,706 B2 * | 12/2009 | Steinbock | ............. | B30B 15/045 411/432 |
| 8,266,781 B2 * | 9/2012 | Bucknell | ............... | B23P 19/067 29/446 |
| 8,739,697 B1 | 6/2014 | Shreve | | |
| 8,864,404 B2 * | 10/2014 | Bucknell | ............... | F16B 31/043 403/31 |
| 9,188,146 B1 * | 11/2015 | Trautman | ................ | B25B 29/02 |
| 9,216,495 B2 * | 12/2015 | Farineau | ................. | B25B 11/02 |
| 9,321,161 B2 * | 4/2016 | Ceney | ................. | B25B 23/0035 |
| 10,422,225 B2 * | 9/2019 | Hofsommer | ............ | F01D 5/026 |
| 10,569,401 B2 * | 2/2020 | Ribault | ................... | B25B 29/02 |
| 2003/0135975 A1 | 7/2003 | Abbott | | |
| 2011/0203424 A1 | 8/2011 | Riestra | | |
| 2014/0174262 A1 | 6/2014 | Hohmann | | |
| 2017/0051611 A1 * | 2/2017 | Hofsommer | ............ | F01D 5/066 |
| 2018/0149534 A1 * | 5/2018 | Kury | ....................... | F16B 31/02 |

FOREIGN PATENT DOCUMENTS

| | | |
|---|---|---|
| GB | 2274893 A | 8/1994 |
| WO | 2007043143 A1 | 4/2007 |

OTHER PUBLICATIONS

Written Opinion for corresponding application PCT/US2017/037834 filed Jun. 16, 2017; dated Oct. 6, 2017.
Chinese Office Action for corresponding application 201780043908.2; Report dated Jun. 11, 2020.
European Search Report for corresponding application EP 17 81 4153; Report dated Jan. 24, 2020.
Chinese Office Action for corresponding application 201780043908.2 dated Mar. 12, 2021.

* cited by examiner

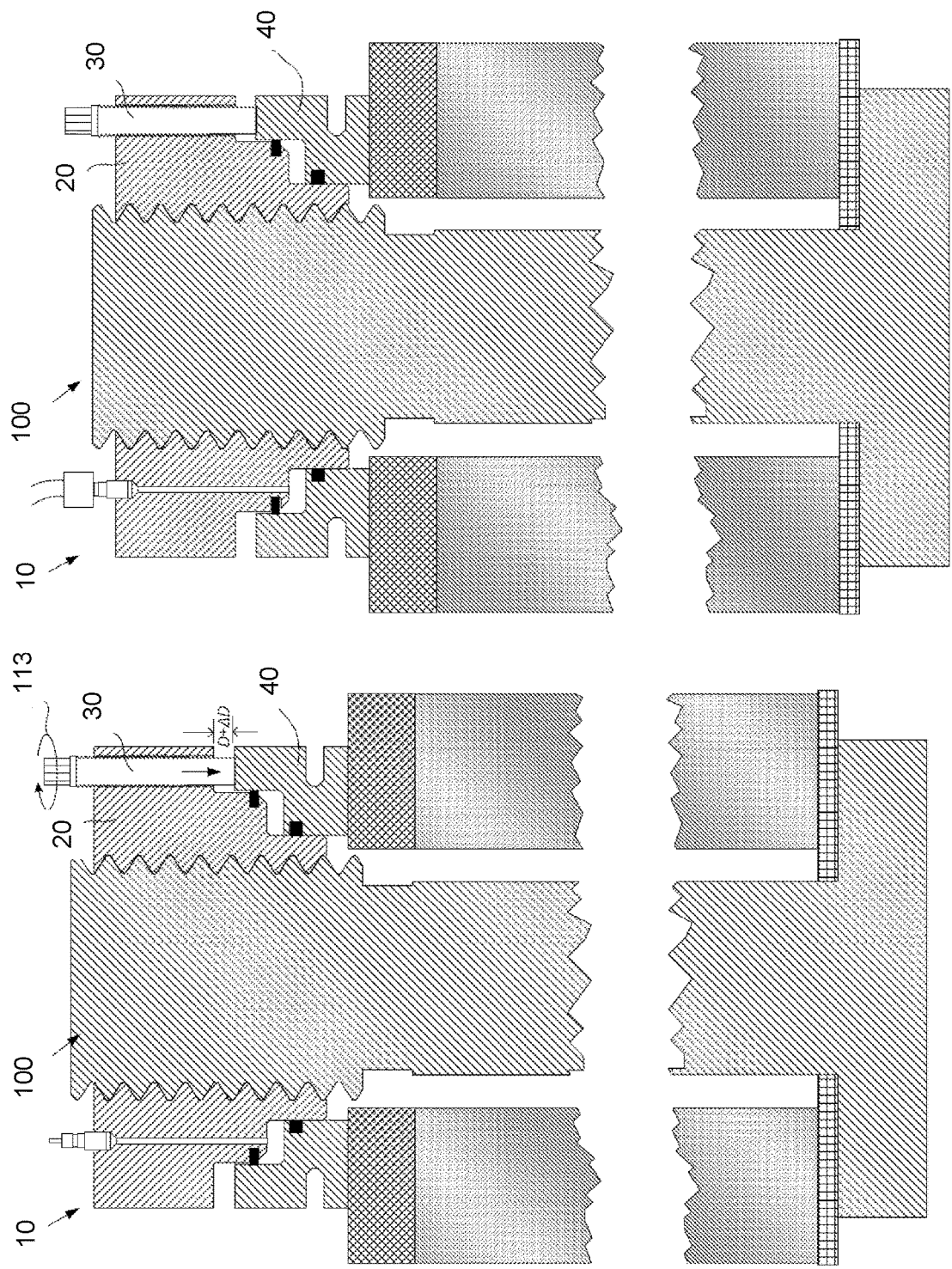

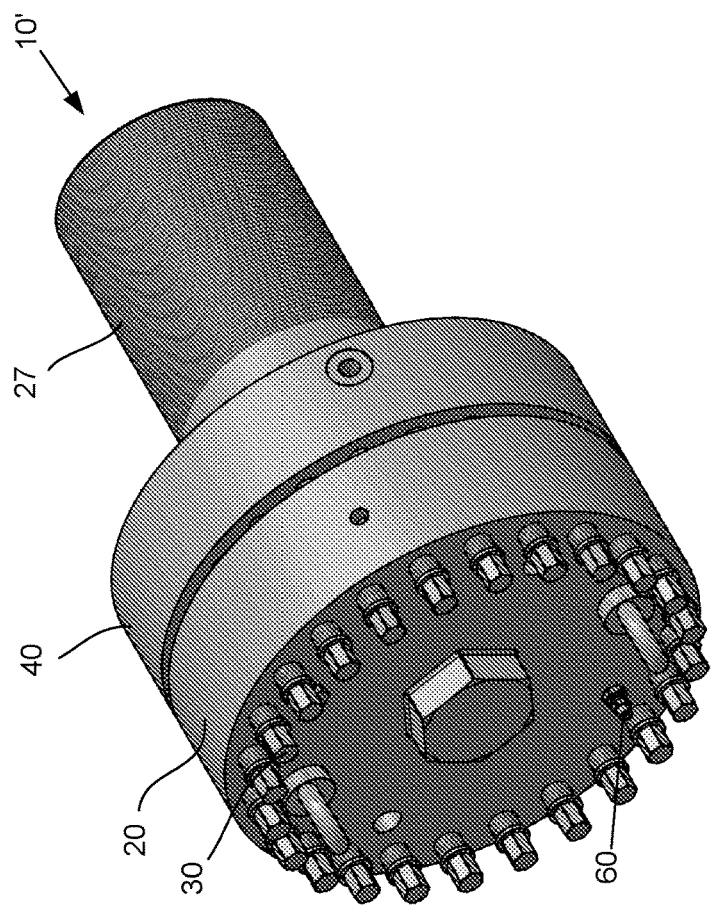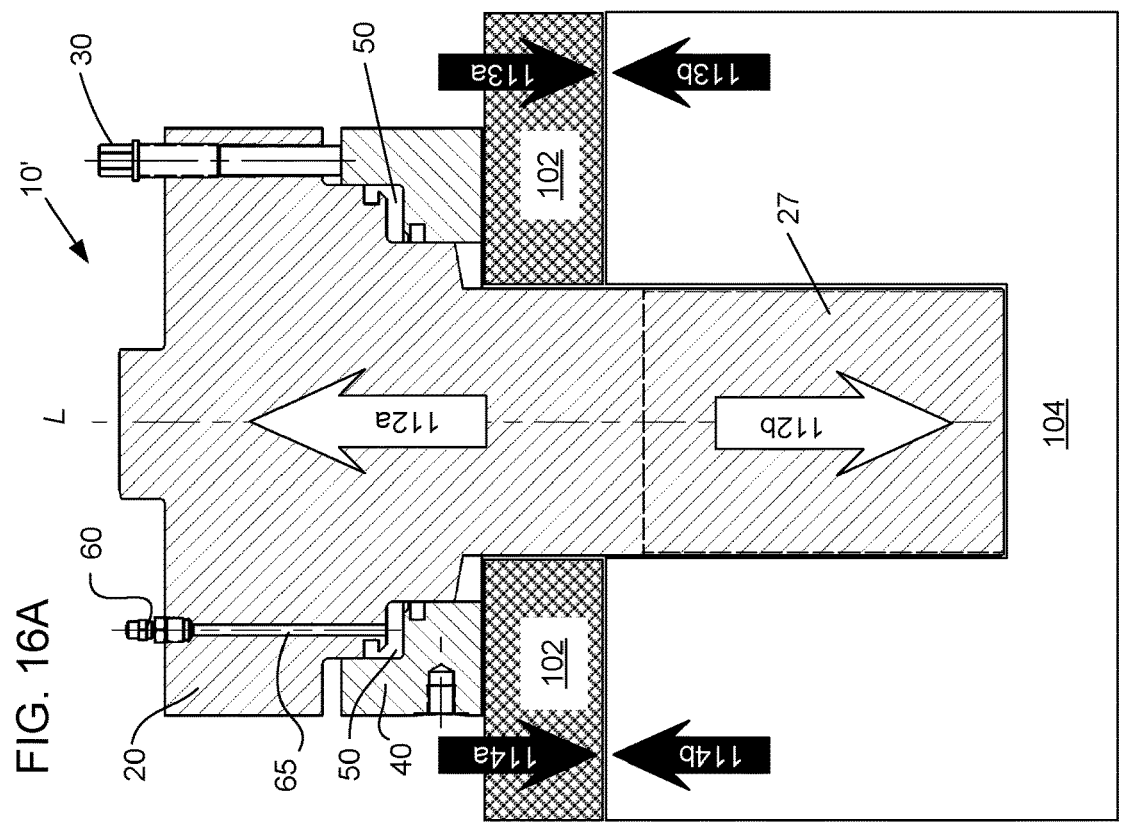

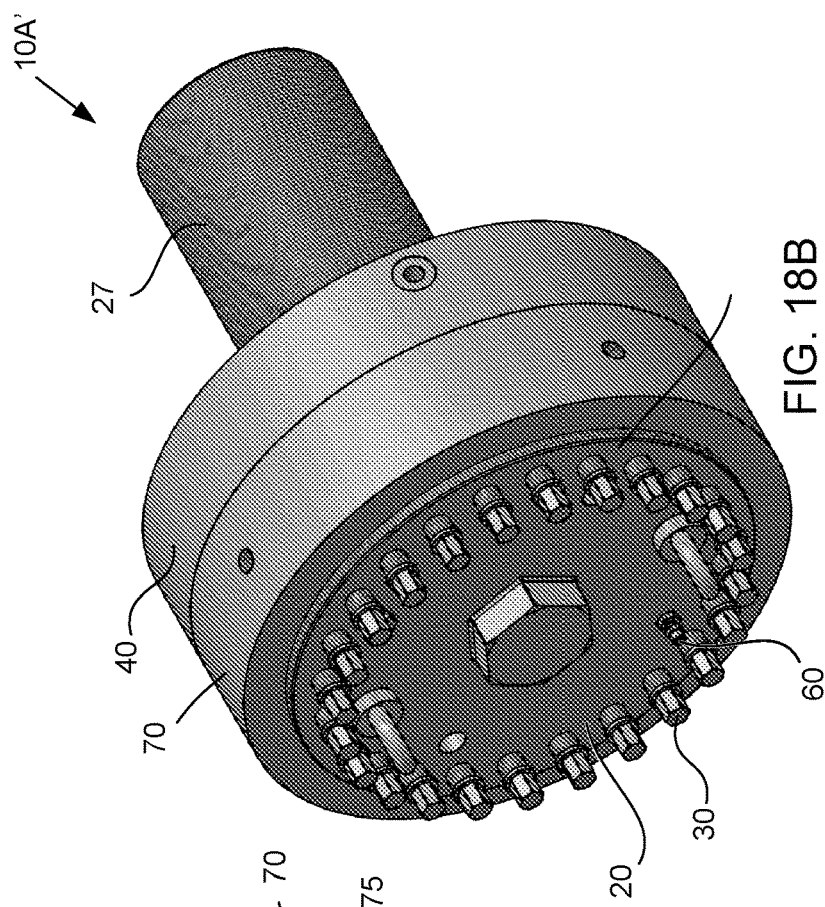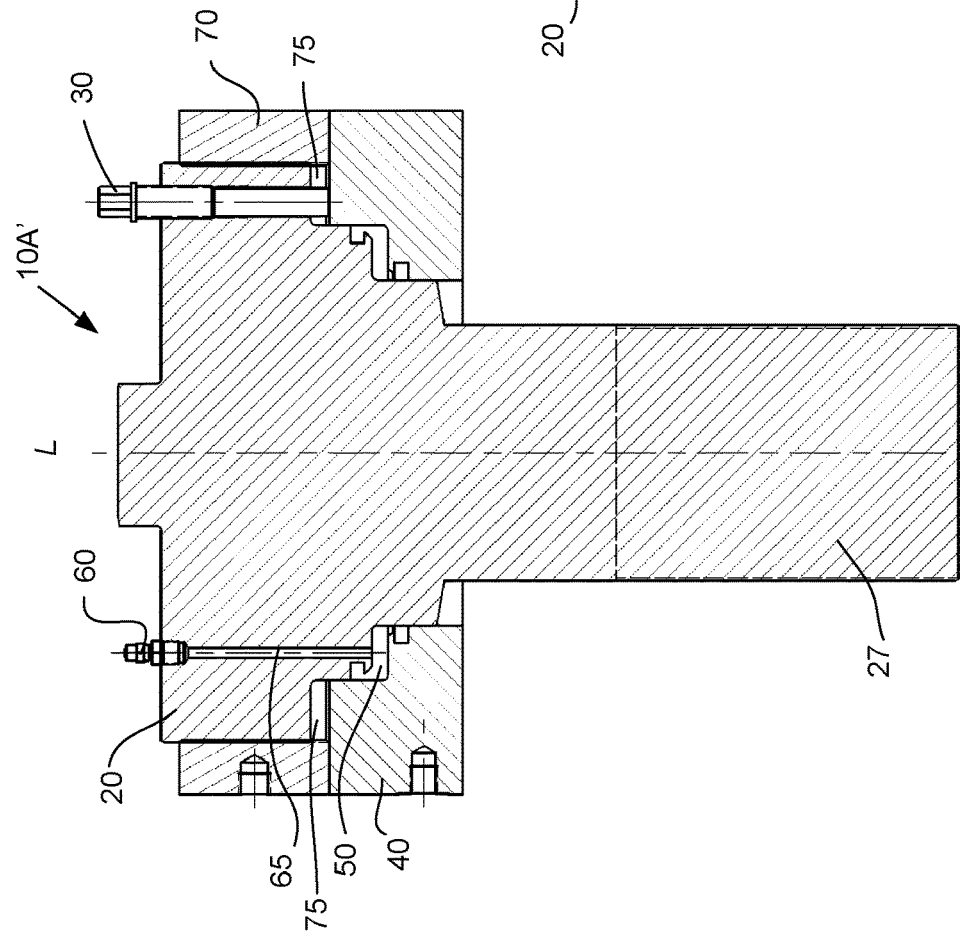

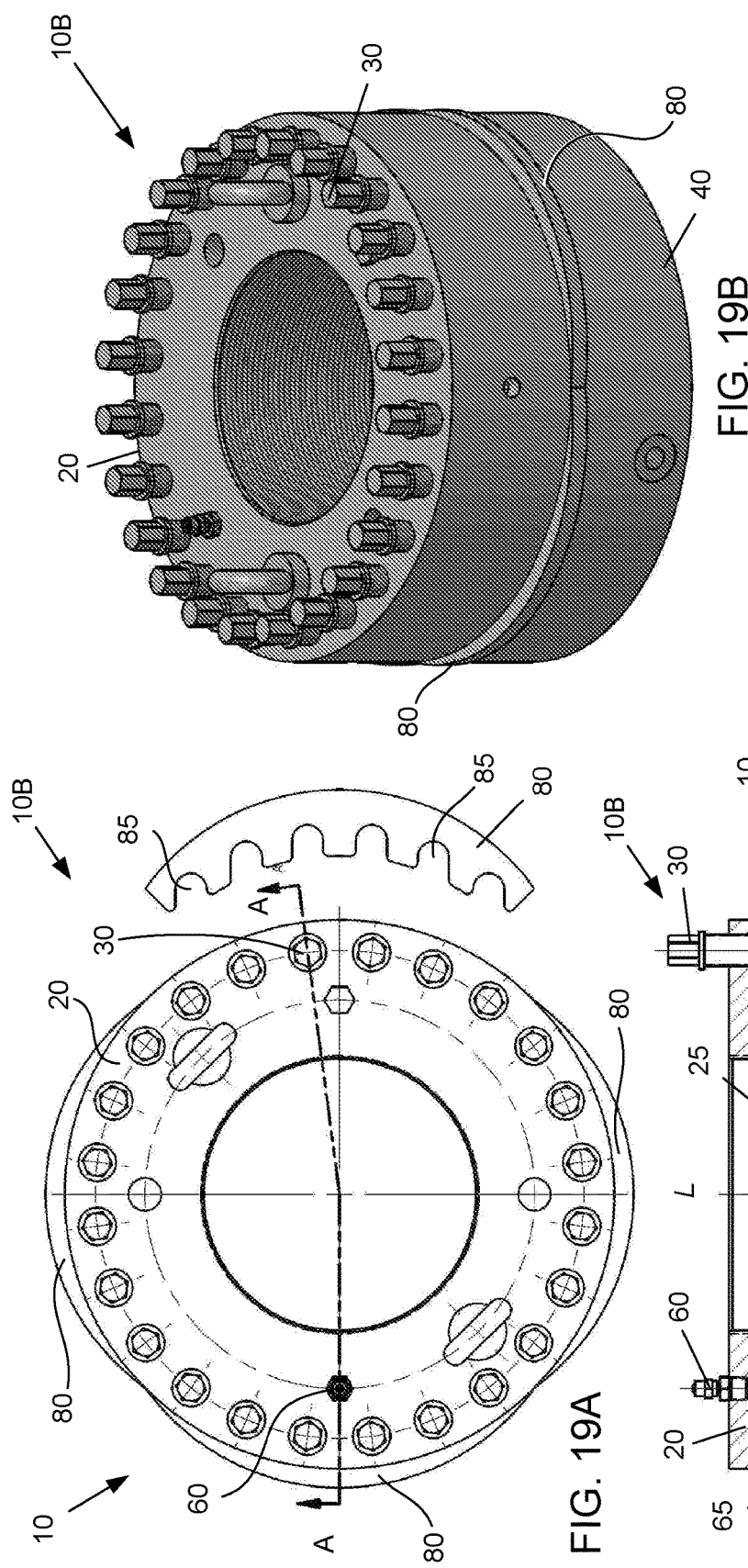

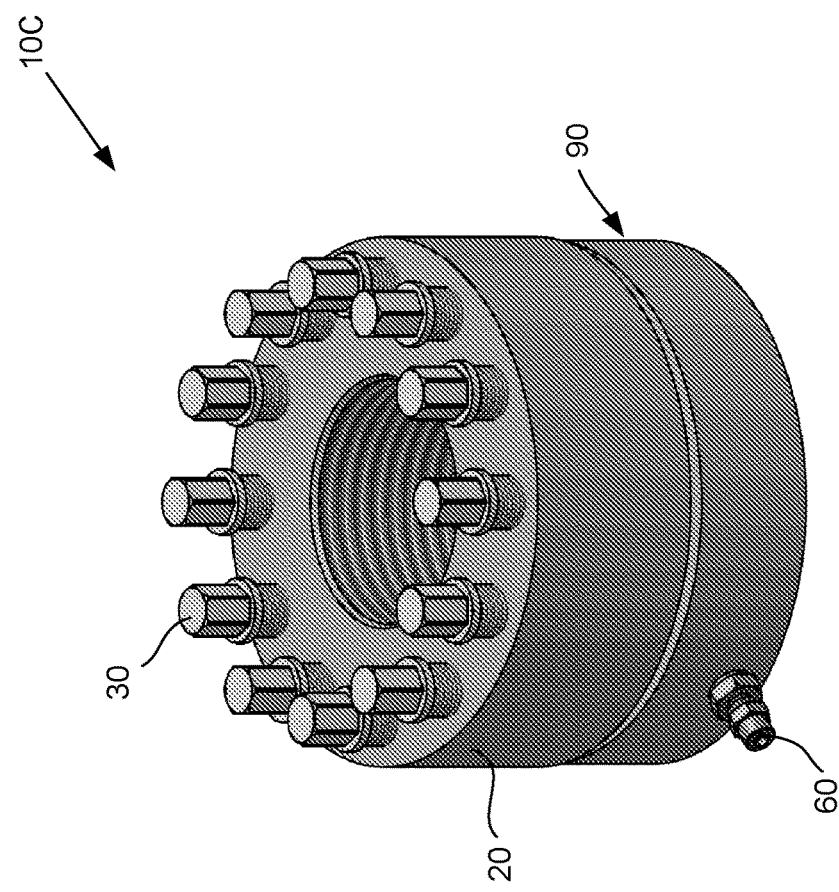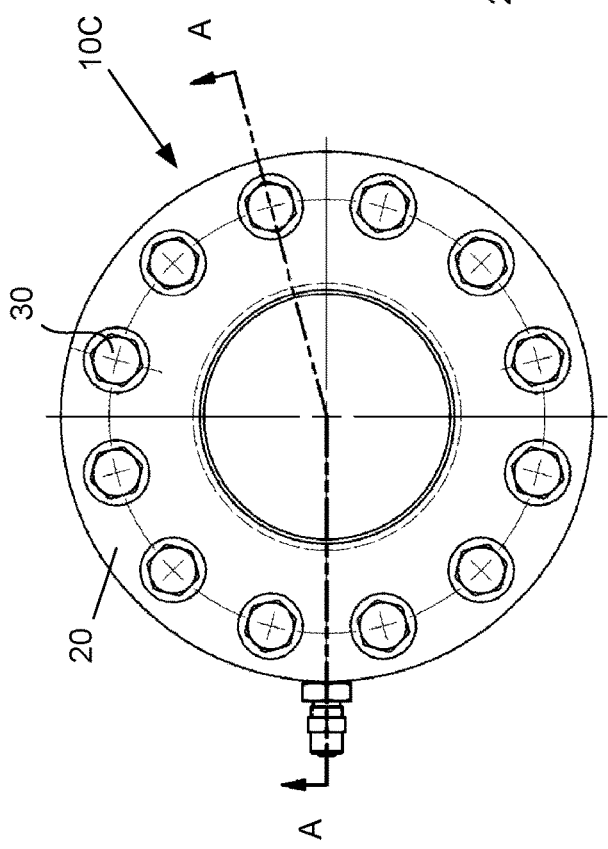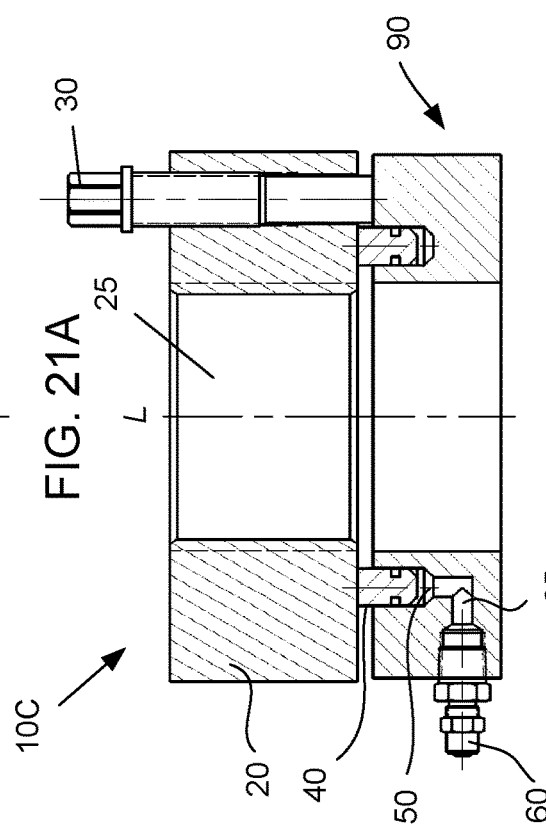

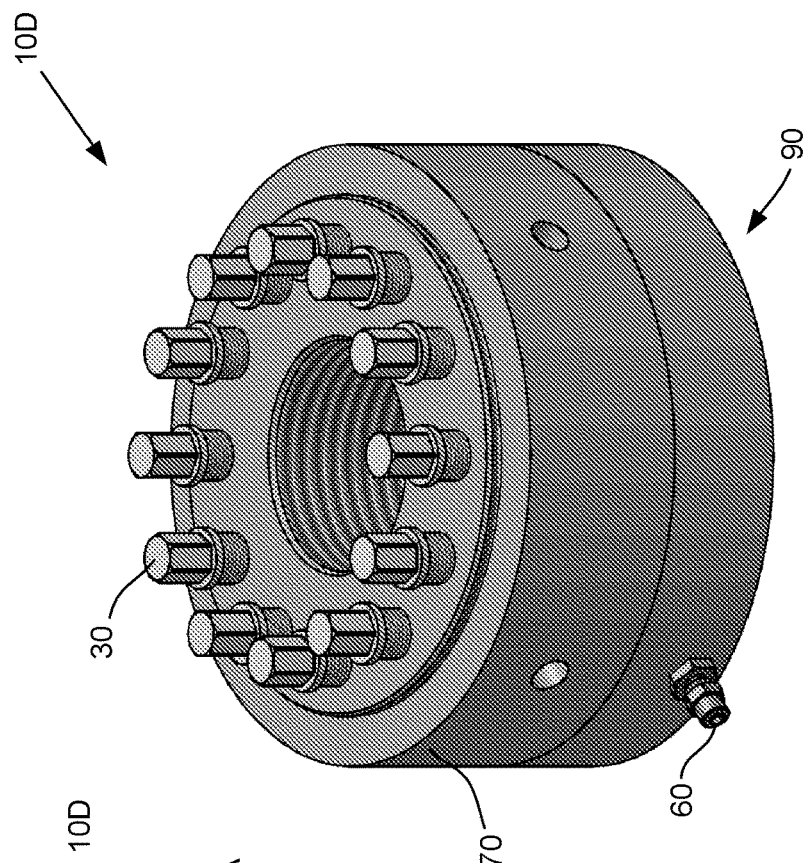
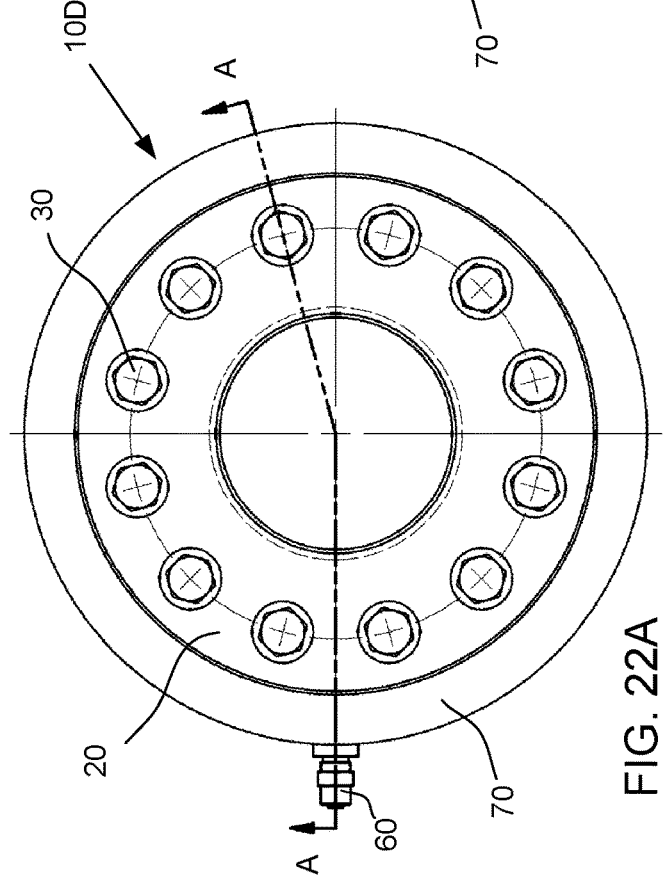
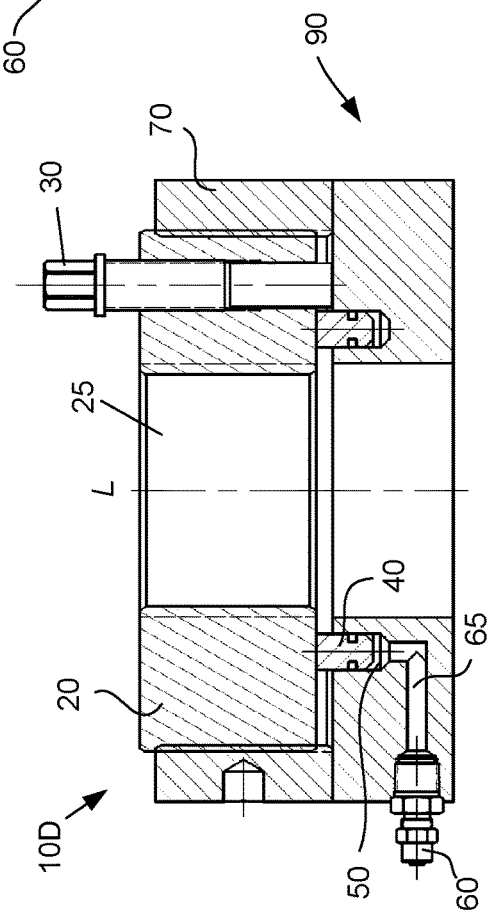
FIG. 22A
FIG. 22B
FIG. 22C

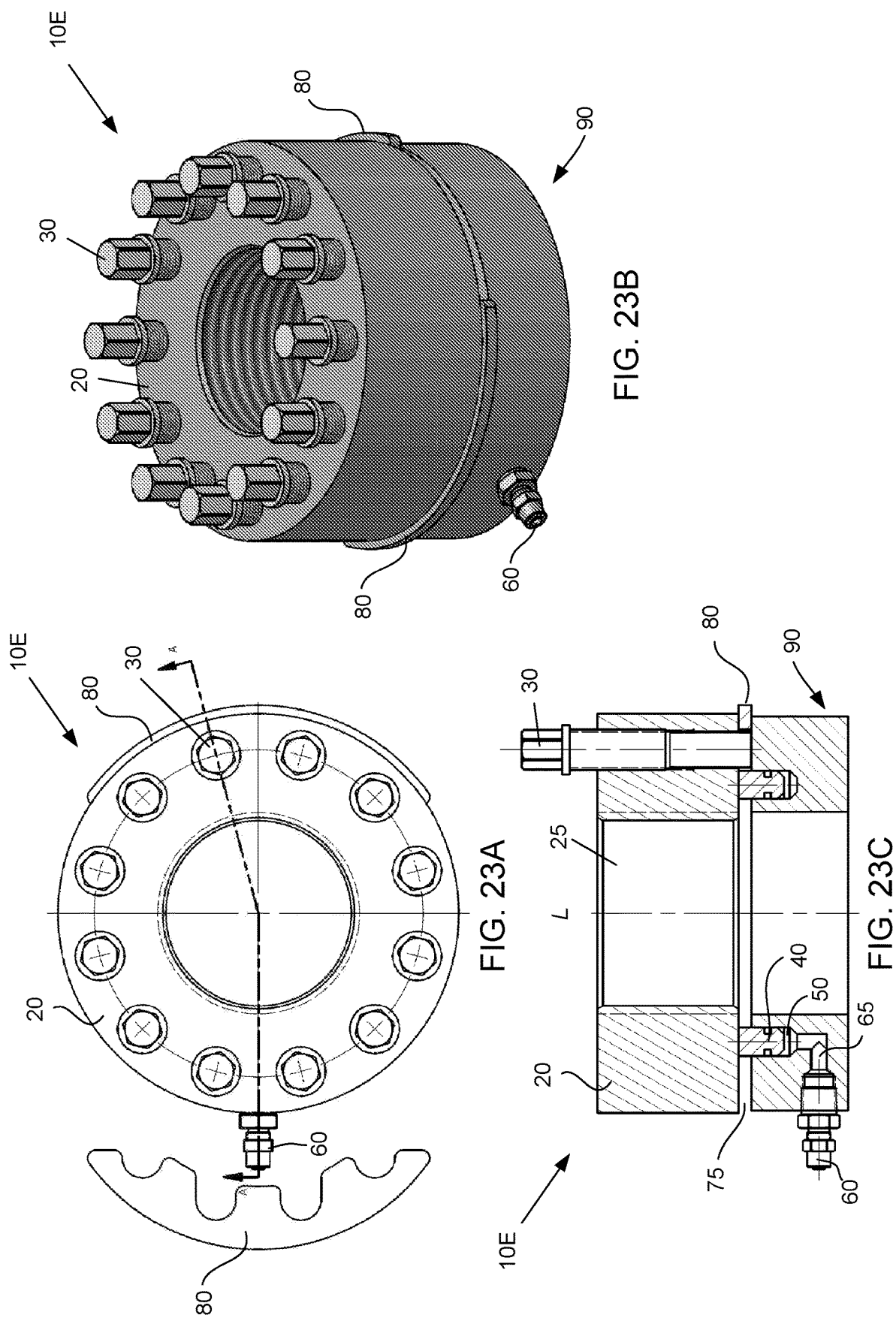

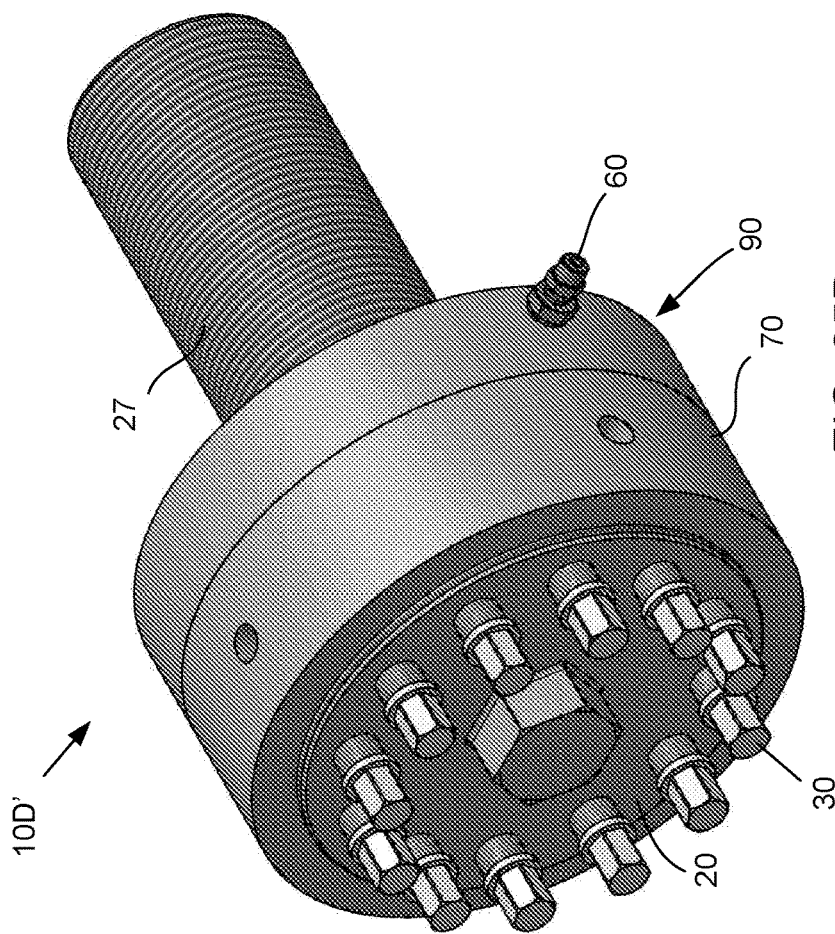
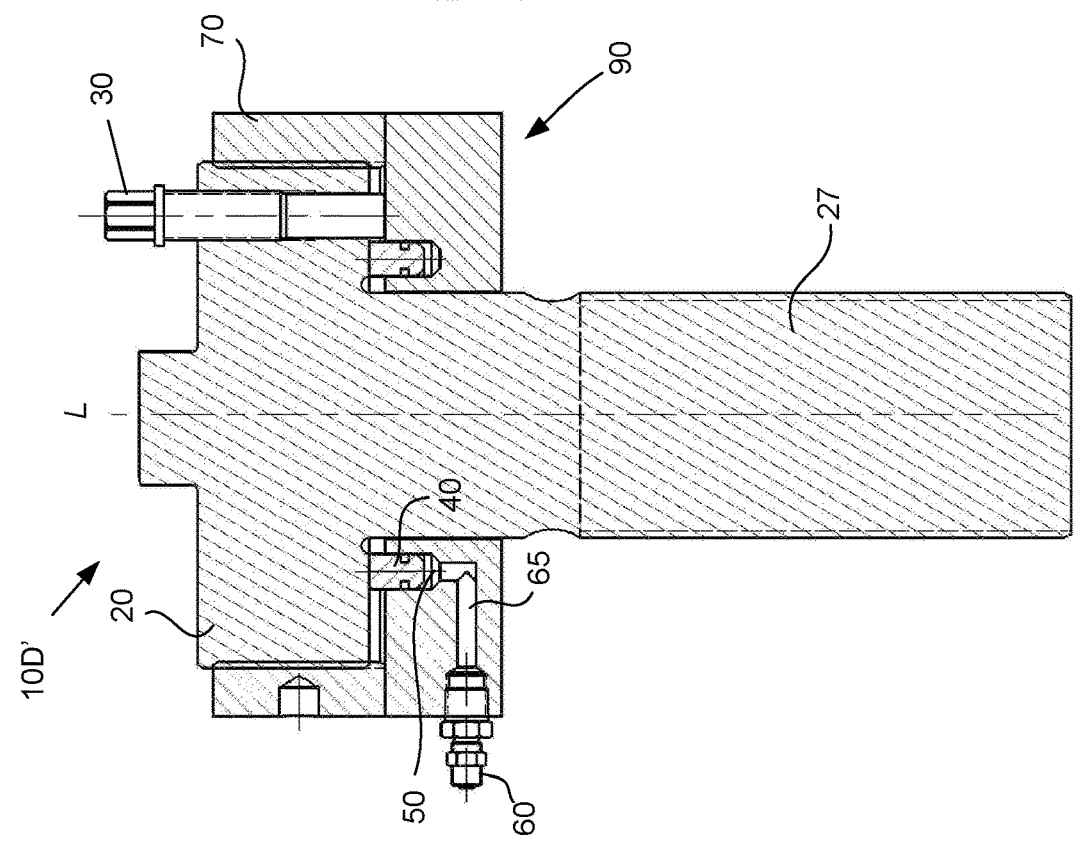

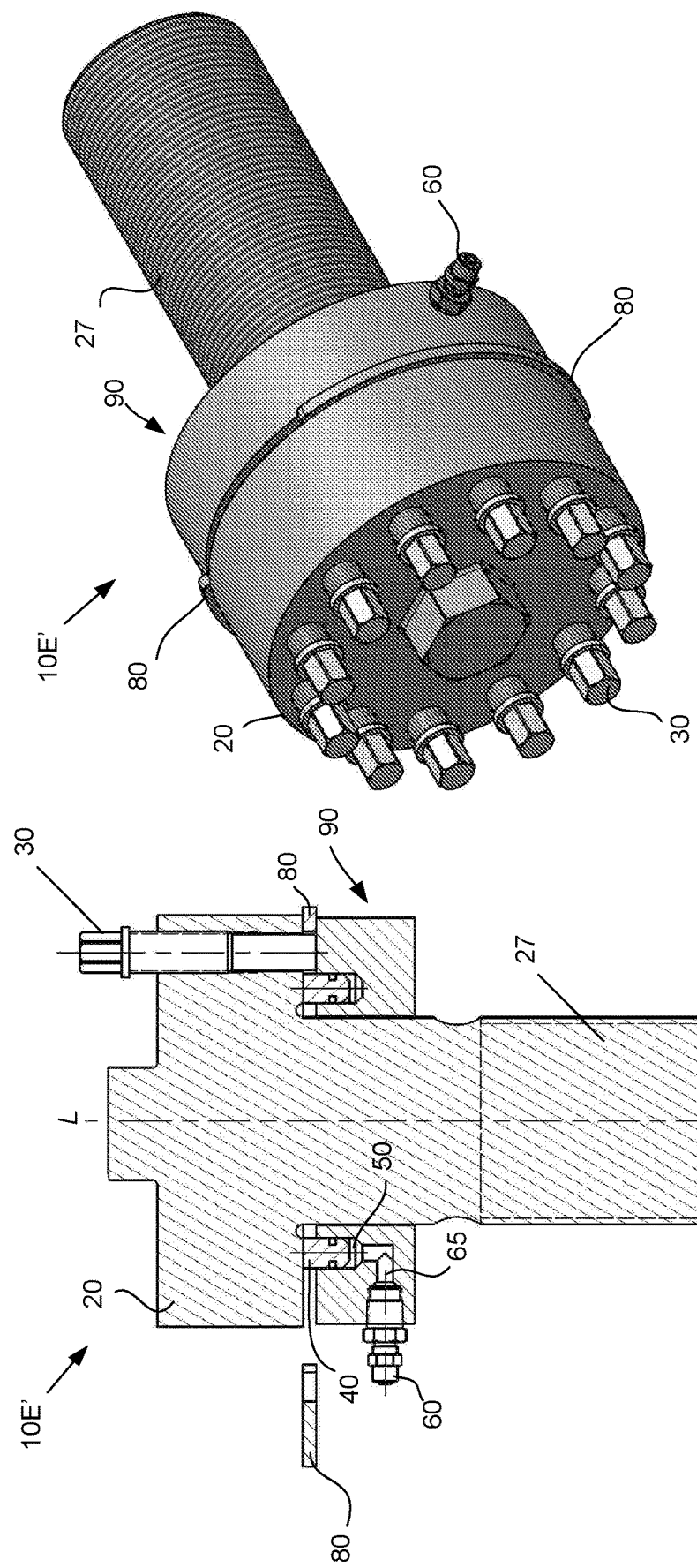

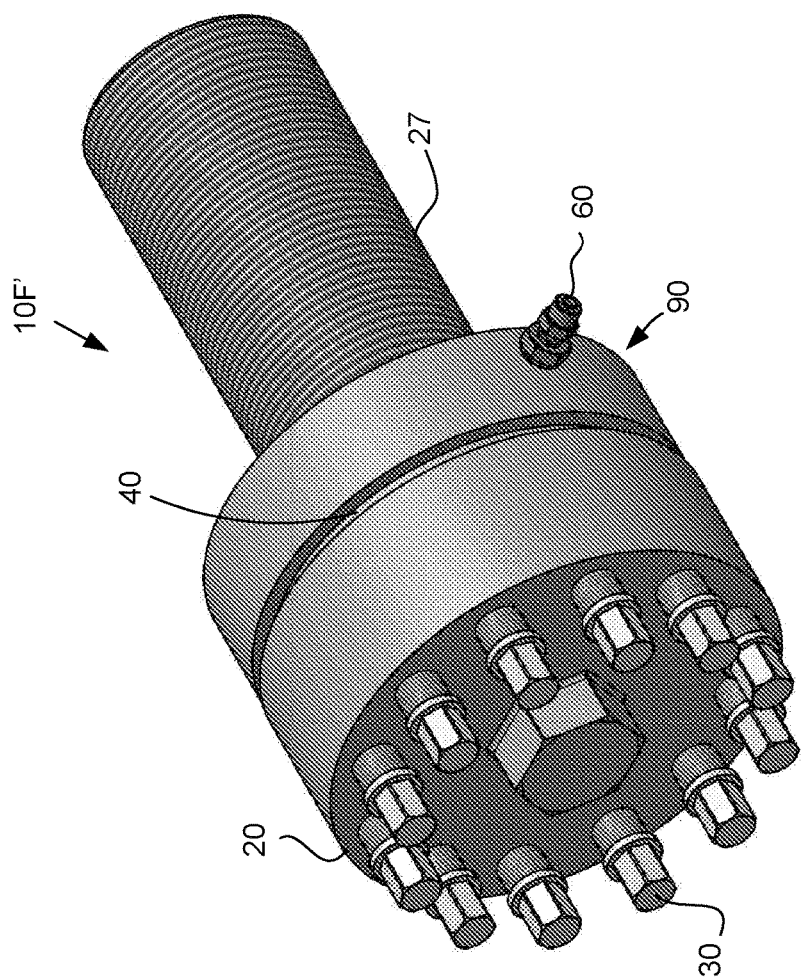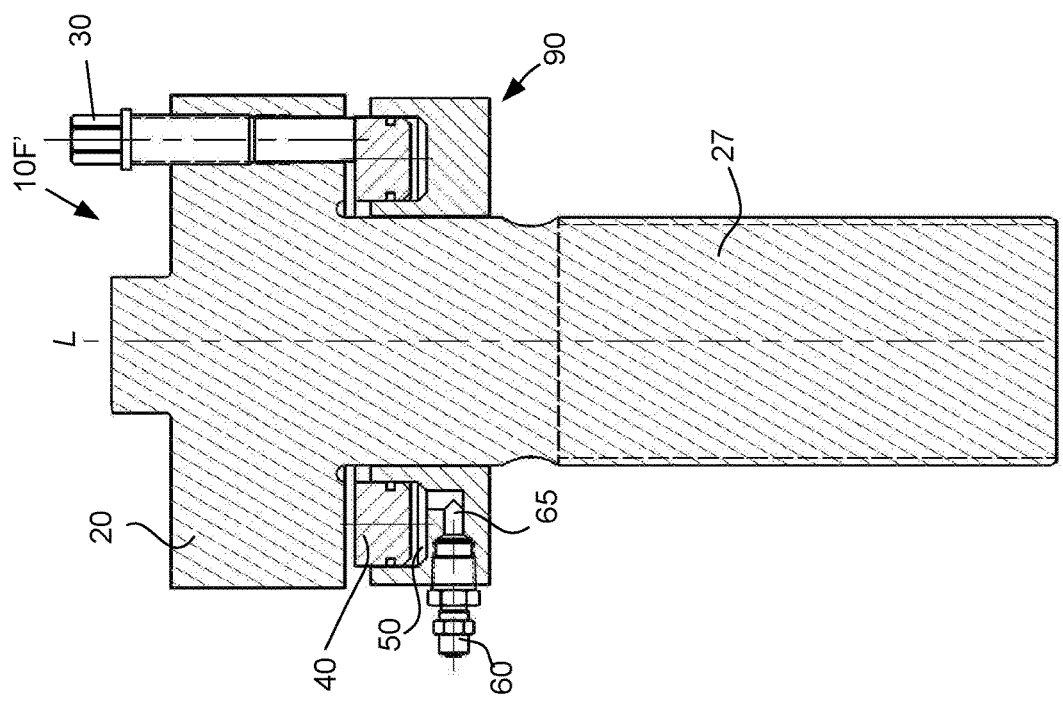

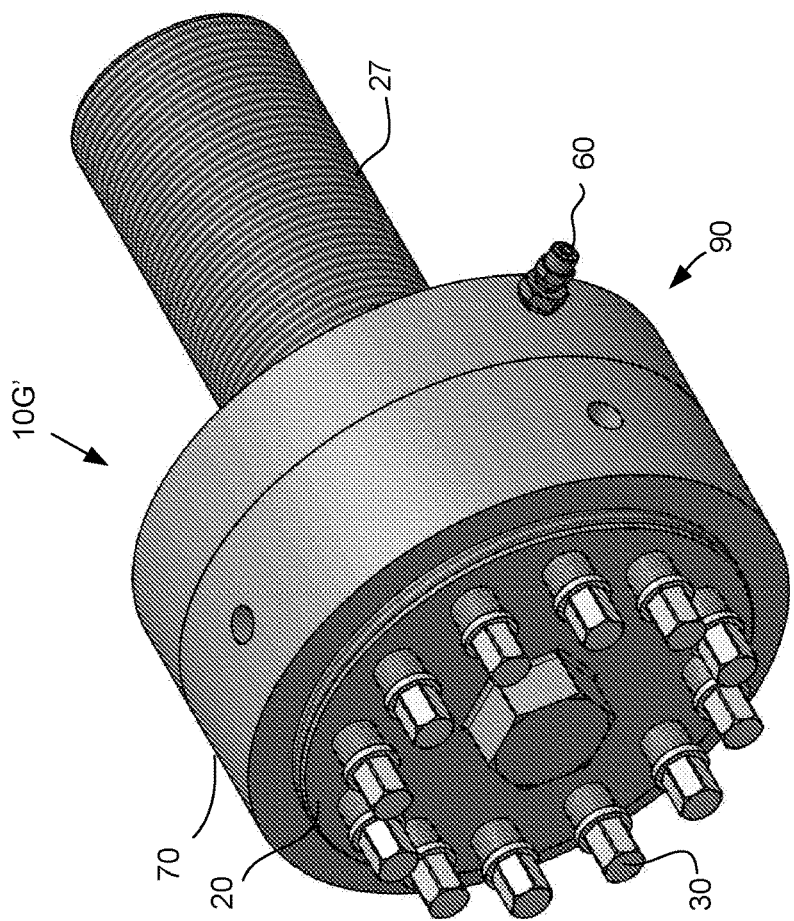
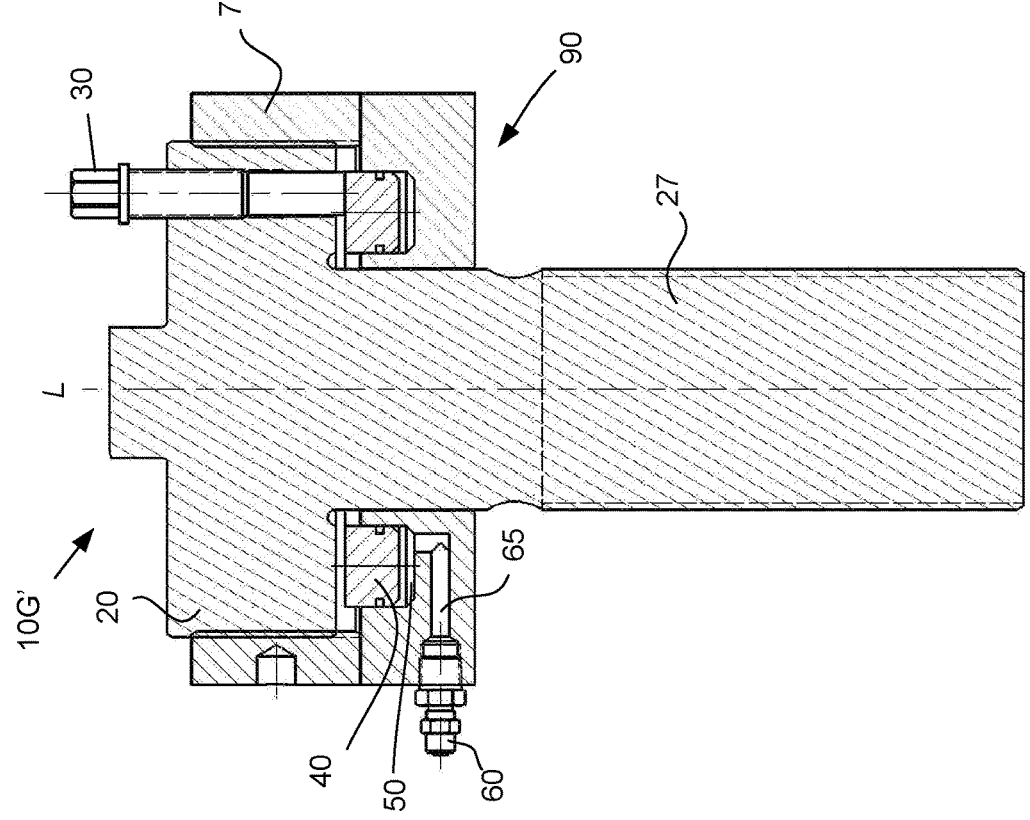
FIG. 31B
FIG. 31A

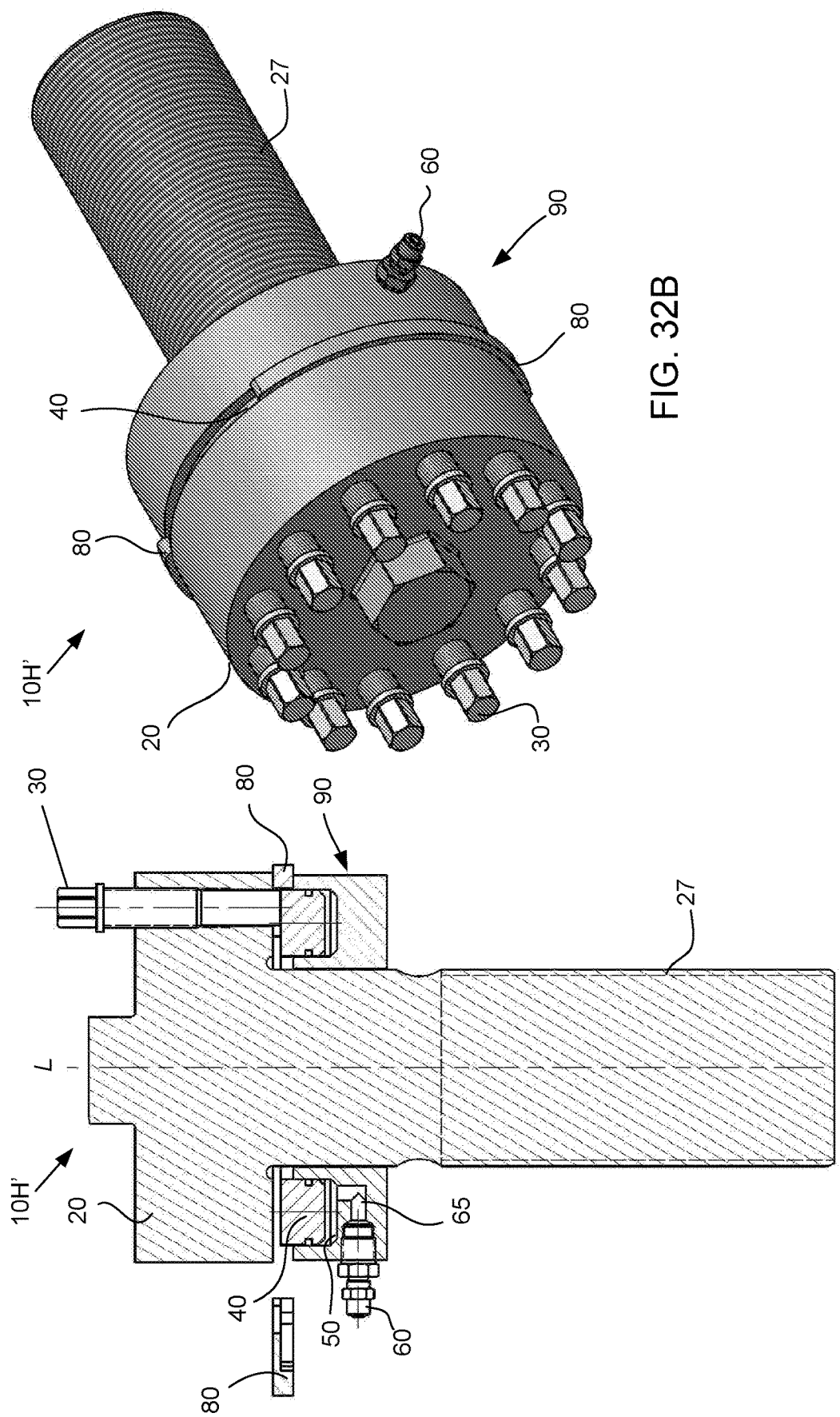

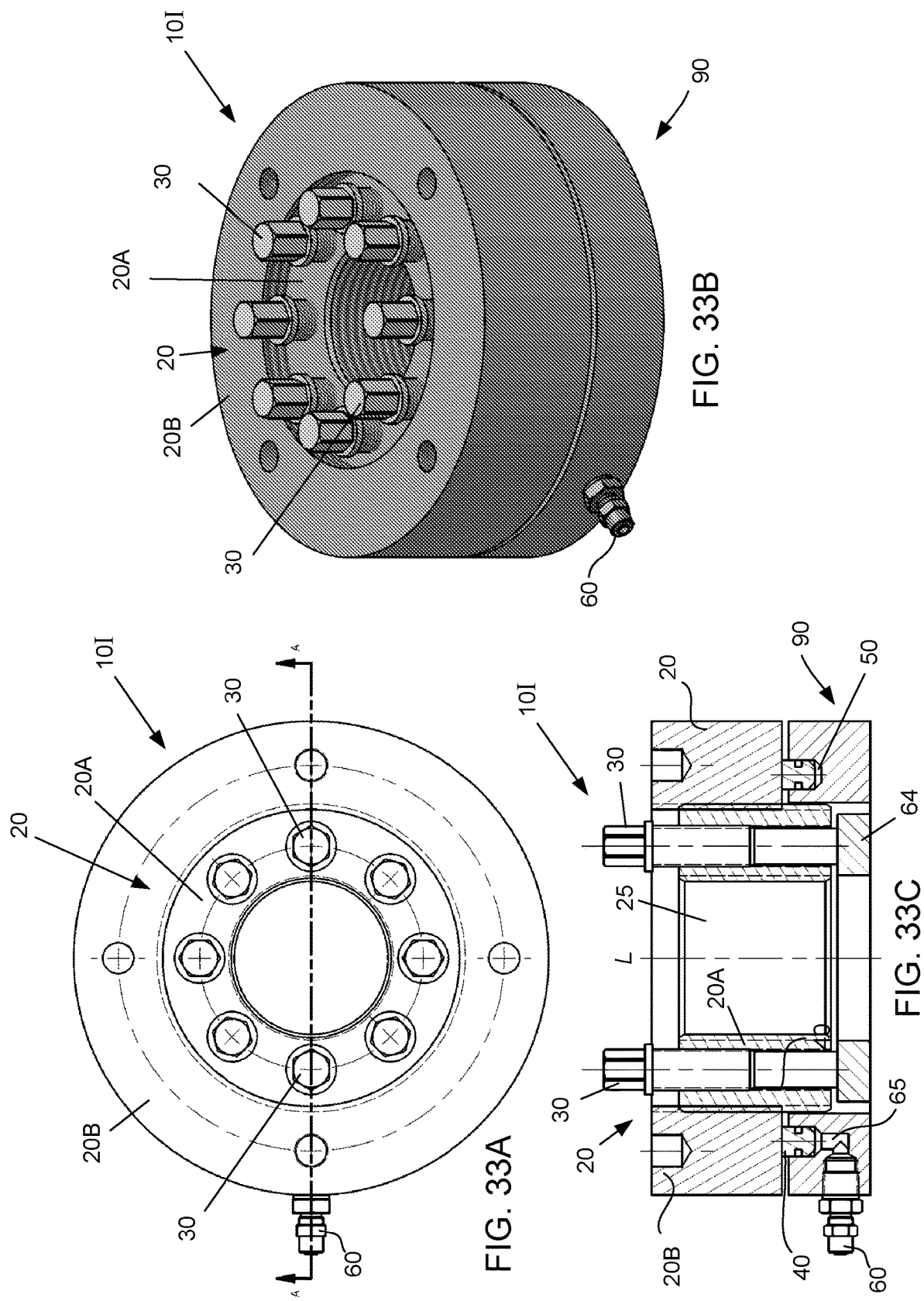

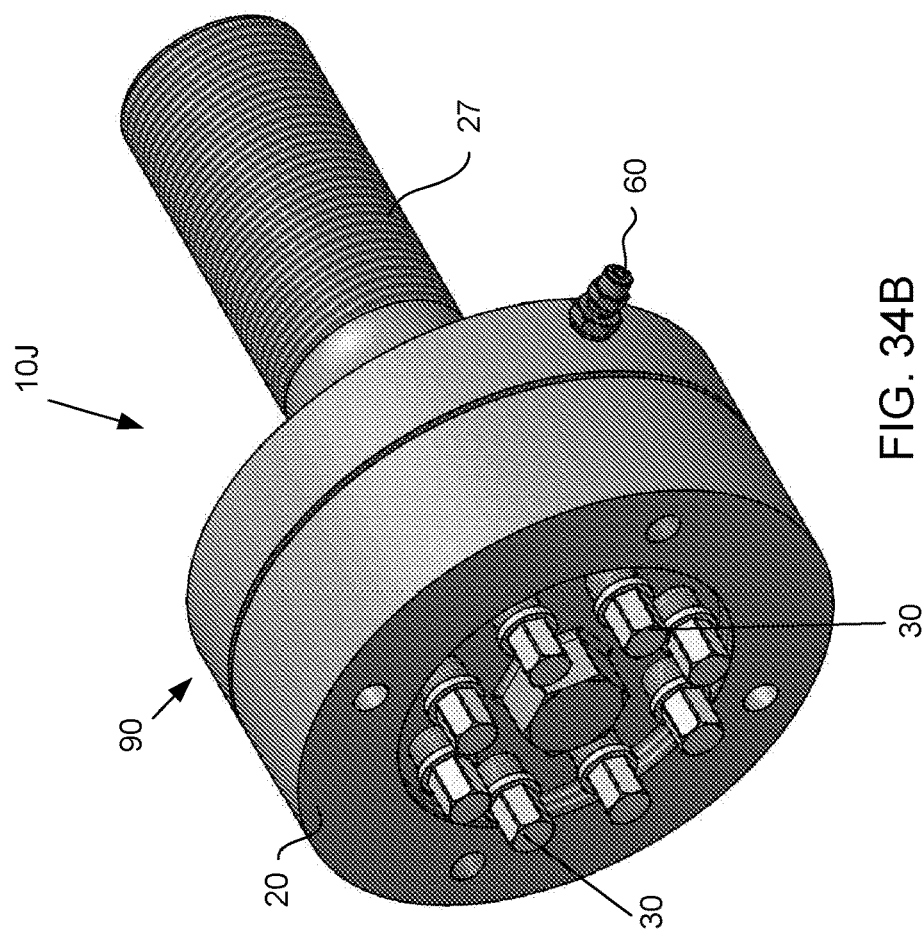
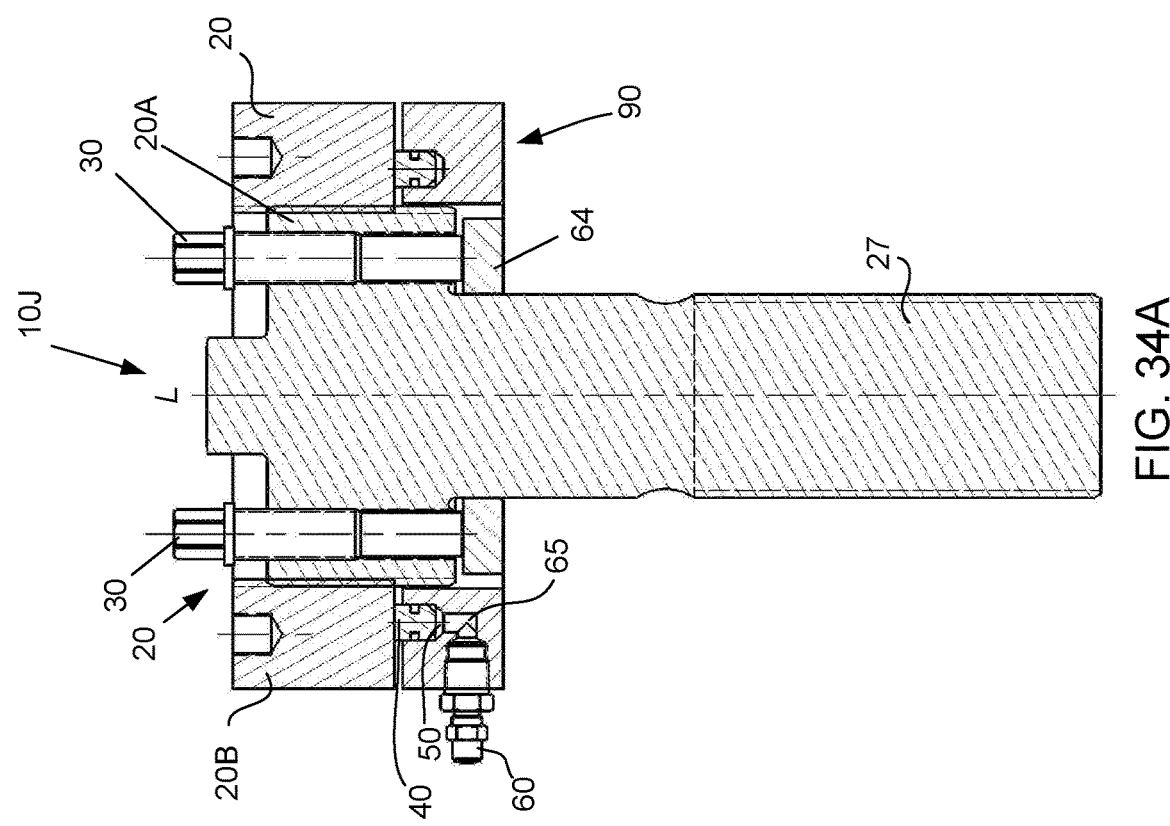
FIG. 34B
FIG. 34A

MULTI-JACK TENSIONERS

FIELD OF INVENTION

The present disclosure generally relates to hydraulically assisted fastening and/or tensioning devices, and methods of using the same.

BACKGROUND

A multi jack bolt tensioner (MJT) may be used for tightening bolts, shafts, or studs in the oil and gas, energy, transportation, and mining industries, for example. The MJT may be used as a direct replacement for conventional nuts and bolts. FIG. 1 is a partially cutaway version of a nut-style MJT 200. The MJT 200 comprises an annular body 202. The body 202 of the MJT 200 is formed with a threaded central hole 205 to receive a bolt, shaft, or stud. A polar array of threaded jack bolt holes 201, each disposed on a circle concentric with the central hole, pass though the body 202. Corresponding jack bolts 204 traverse the jack bolt holes 201 and are threadedly received therein. The MJT 200 further includes a load bearing member in the form of a hardened washer 206 against which points of the jack bolts 204 abut in use. The hardened washer 206 bears against a workpiece being fastened.

As an alternative to the nut-style MJT of FIG. 1, bolt-style MJTs are also known. A bolt-style MJT generally comprises a body having a threaded shaft that may be used for blind tapped holes and counterbores. MJTs are commercially available from Superbolt, Carnegie Pa. Further discussions of MJTs may be found in U.S. Pat. Nos. 4,622,730, RE33,490, 4,927,305, 5,075,950, 5,083,889 and 6,112,396, which are incorporated herein by reference. Throughout this specification the reference to methods and documents of the prior art should not be taken as an admission or evidence that any such prior art information constitutes common general knowledge.

FIGS. 2 to 6 illustrate the use of the MJT 200. With reference to FIG. 2, initially hardened washer 206 is installed onto the stud 208. The body 202 is then threaded onto the stud 208 until it seats against the hardened washer 206 to tension the joint. In FIG. 2 the jack bolts 204 are withdrawn so that their points do not extend out of the body 202 of the MJT. Referring now to FIG. 3, once the washer 206 has been located over the stud 208 and the MJT 200 has been threaded onto the stud and into abutment with the washer 206 then four of the jack bolts at 90 degrees apart (i.e. 12 o'clock, 6 o'clock, 9 o'clock and 3 o'clock as circled in FIG. 3) are tightened with a partial torque of 30-70% and this process is then repeated for the remaining four jack bolts. Applying partial torque evenly distributed to all of the jack bolts 204 serves to seat the hardened washer 206 against the contact surface 209 to be fastened, e.g. a flange. With reference to FIG. 4, at 100% target torque the same four jack bolts are then tightened. With reference to FIG. 5, at 100% target torque all of the jack bolts 204 are tightened in a circular pattern. Referring now to FIG. 6, all of the jack bolts 204 are tightened again with a torque wrench 212 for example until they stabilize (usually less than 10 degrees of rotation of each jack bolt 204 is involved in this step). This step may need 2-4 additional passes around the jack bolts so that all of the jack bolts are incrementally tightened and at any one time there is no great imbalance of tension between them.

When the jack bolts 204 are torqued, a tension preload develops evenly along the stud 208, and the axial forces by the jack bolts 204 and opposite reaction force of the stud 208 create a strong clamping force between the surfaces to be fastened together, such as opposed flanges for example. Applying the correct preload is desirable because a pretensioned bolt, shaft or stud may be capable of sustaining a greater load and may reduce the likelihood of the bolt, shaft, or stud loosening unintentionally due to e.g., vibration and/or temperature cycling.

However, it will be realized that properly applying a MJT, as has been explained with reference to FIGS. 2 to 6, is a demanding and time consuming exercise. An experienced operator may take around five minutes to apply an MJT in the manner that has been discussed. It will be understood that where large plants are being installed there may be hundreds or thousands of MJTs to be fitted. In that case a saving of time for the installation of each MJT results in a very considerable saving of worker hours for the overall project at hand. Furthermore, ensuring that the jack bolts are tightened so that they uniformly and evenly apply force to the hardened washer is a somewhat demanding operation that requires applying torque to the jack bolts in a predetermined sequence. Where the sequence is not followed correctly one of the consequences is that there may be an imbalance in the tensioning of the jack bolts which potentially could lead to a catastrophic failure.

It would be advantageous if an apparatus were provided that allowed for the proper and faster placement of jack bolts of an MJT type fastener to thereby address the previously described problems.

SUMMARY

According to a first aspect of the present invention there is provided a multi jack tensioner including: a body portion formed to engage an elongate fastening member or integrally formed therewith;

a load bearing member for applying force to a workpiece to be fastened and arranged for location about said fastening member adjacent the body portion;

a pressure chamber between the load bearing member and the body portion arranged to displace the body portion from the load bearing member in response to hydraulic pressure; and a plurality of jack bolts extending between the body portion and the load bearing member for further displacing the body portion from the load bearing member;

wherein application of hydraulic pressure to the hydraulic chamber displaces the body portion from the load bearing member for tensioning said fastening member and whereby subsequent tensioning of the fastening member is applied by operation of the jack bolts.

Preferably the body portion is formed with an axial recess to threadedly engage the elongate fastening member wherein the elongate fastening member comprises a bolt or stud.

In some embodiments the body portion is integrally formed with the elongate fastening member.

In some embodiments of the invention the load bearing member is formed as a piston arranged to cooperate with the body.

Alternatively the load bearing member may be formed as a load cell with which a piston cooperates that forces the body in use.

Preferably the plurality of jack bolts comprises an annular array of jack bolts threadedly received through holes formed spaced uniformly from a longitudinal central axis of the body at spaced apart locations about an outer surface thereof.

In some embodiments of the invention a piston is slidingly received into the body, and a pressure chamber between the body and piston to receive hydraulic fluid through a port and a fluid passage, wherein when the pressure chamber receives hydraulic fluid, the body and piston axially separate.

The invention encompasses embodiments wherein each of the plurality of jack bolts is in threaded engagement with the body portion and projects from the body portion into compressive engagement with the load bearing member.

The load bearing member may comprise the piston, a load cell, and a washer.

In one embodiment the load bearing member comprises a load cell.

The loading bearing member comprises a washer in some embodiments of the invention.

A locking collar may be provided for maintaining a distance between the load bearing member and the body subsequent to removal of the hydraulic pressure.

In some embodiments at least one shim is provided for maintaining a distance between the load bearing member and the body subsequent to removal of the hydraulic pressure.

A port for entry of the hydraulic pressure may be positioned on a side outer periphery of the load cell along a plane perpendicular to the longitudinal central axis that does not intersect any jack bolt.

The port may be positioned on a side outer periphery of the load cell along a plane perpendicular to the longitudinal central axis that intersects two jack bolts.

According to another aspect of the present invention there is provided a method for compressing first and second workpieces together comprising the steps of:

passing an elongate fastening member through the first and second workpieces wherein a first end of the elongate fastening member is captured on an outer side of the first workpiece;

tensioning the elongate fastening member by applying hydraulic pressure between said second end of said fastening member and an outer side of the second workpiece; and further tensioning the elongate member with jack bolts;

whereby the tensioning of the elongate fastening member results in compressing the first and second workpieces towards each other.

According to another aspect of the present invention there is provided a method of closing a vessel having at least one stud, the method comprising:

threading a first hydraulic compression tool onto the at least one stud, wherein the hydraulic compression tool comprises a body having a threaded shaft, and a plurality of jack bolts spaced uniformly from a longitudinal central axis at spaced apart locations about an outer periphery thereof, a piston slidingly received into the body to define a pressure chamber therebetween to receive hydraulic fluid through a port and a fluid passage, and wherein the body and piston axially separate when the tool is mounted to the stud and the pressure chamber receives hydraulic fluid;

injecting hydraulic fluid into the chamber to tension the at least one stud; and torquing the plurality of jack bolts to close the vessel.

The method may further comprise:

threading a second hydraulic compression tool onto another of the at least one stud, and simultaneously injecting hydraulic fluid into the pressure chamber of each of the hydraulic compression tools threaded onto the at least one shaft, wherein each of the pressure chambers are in fluid communication with the other to tension the at least one stud to substantially equal preloads.

The method may further comprise threading at least one multi jack bolt tensioner to another of the at least one stud adjacent to the hydraulic compression tool threaded onto the at least one stud.

According another aspect of the present invention there is provided a multi jack tensioner including:

a body portion formed to engage an elongate fastening member or integrally formed therewith;

a load bearing member for applying force to a workpiece to be fastened and arranged for location about said fastening member adjacent the body portion;

a pressure chamber between the load bearing member and the body portion arranged to displace the body portion from the load bearing member in response to hydraulic pressure; and a plurality of jack bolts extending between the body portion and the load bearing member for further displacing the body portion from the load bearing member;

wherein application of hydraulic pressure to the hydraulic chamber displaces the body portion from the load bearing member for tensioning said fastening member and whereby subsequent tensioning of the fastening member is applied by operation of the jack bolts.

In a "nut-style" embodiment of the invention the body portion is formed with an axial recess to threadedly engage the elongate fastening member wherein the elongate fastening member comprises a bolt or stud.

In a "bolt-style" embodiment of the invention the body portion is integrally formed with the elongate fastening member.

The load bearing member may be formed as a piston which cooperates with the body.

Alternatively the load bearing member may be formed as a load cell with which a piston cooperates that forces the body in use.

In a preferred embodiment of the invention the plurality of jack bolts comprises a polar array of jack bolts threadedly received through holes formed spaced uniformly from a longitudinal central axis of the body at spaced apart locations about an outer surface thereof.

In one embodiment of the invention there is provided a piston slidingly received into the body, and a pressure chamber between the body and piston to receive hydraulic fluid through a port and a fluid passage, wherein when the pressure chamber receives hydraulic fluid, the body and piston axially separate.

It is preferred that the step of tensioning by applying hydraulic pressure and the step of further tensioning with jack bolts are performed at the same end of the elongate fastening member however it is possible that the two steps could be performed at opposite ends of the elongate fastening member. In that case a fastening assembly is contemplated with a hydraulic nut at one end and a MJT at another end.

According to a further aspect of the present invention there is provided a method of using a hydraulic compression tool to tension a joint, comprising:

installing the tool on a work piece having the joint to be tensioned, injecting hydraulic fluid into the chamber to axially separate the body and piston and pretension the joint; and torquing the jack bolts to tension the joint. The hydraulic compression tool may comprise a body having a polar array of jack bolts spaced uniformly from a longitudinal central axis at spaced apart locations about an outer surface thereof, a piston slidingly received into the body, and a pressure chamber between the body and piston to receive hydraulic fluid through a port and a fluid passage, wherein when the pressure chamber receives hydraulic fluid, the body and piston axially separate.

DESCRIPTION OF THE DRAWINGS

The embodiments described herein may be better understood by reference to the accompanying Figures, in which:

FIG. 1 is a partially cutaway view of a prior art multi jack bolt tensioner (MJT) for tensioning an elongate fastener such as a bolt, stud or the like.

FIGS. 10-15 illustrate the step by step use of the hydraulic MJT of FIG. 7 to fasten two workpieces together.

FIGS. 16A and 16B illustrate a bolt-style hydraulic compression tool according to an embodiment of the present invention.

FIGS. 18A and 18B illustrate a bolt-style hydraulic compression tool similar to the tool of FIGS. 17A-17C.

FIGS. 19A-19C illustrate a nut-style hydraulic compression tool with locking shims, according to an embodiment of the present invention.

FIGS. 21A-23C illustrate nut-style hydraulic compression tools with load cell, according to embodiments of the present invention.

FIGS. 24A-26B illustrate bolt-style hydraulic compression tools similar to the tools of FIGS. 21A-21C.

FIGS. 30A-32B illustrate bolt-style hydraulic compression tools similar to the tools of FIGS. 27A-29C.

FIGS. 33A-33C illustrate a further nut-style hydraulic compression tool according to an embodiment of the present invention.

FIGS. 34A-34B illustrate a bolt-style hydraulic compression tool similar to the tool of FIGS. 33A-33C.

DETAILED DESCRIPTION

Figure 7:
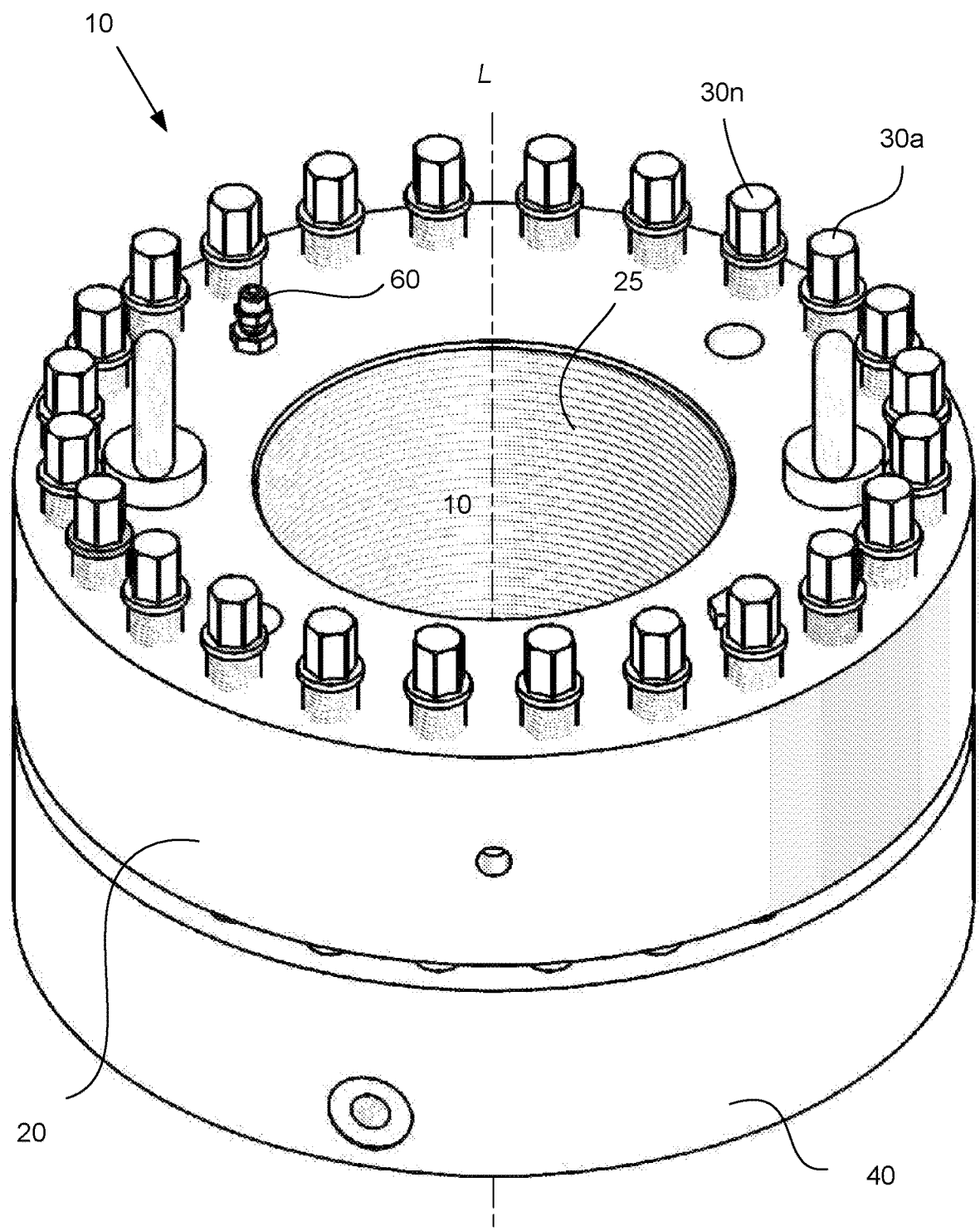
FIG. 7 is an isometric orthogonal view of a hydraulic MJT according to a preferred embodiment of the present invention.
Figure 8:
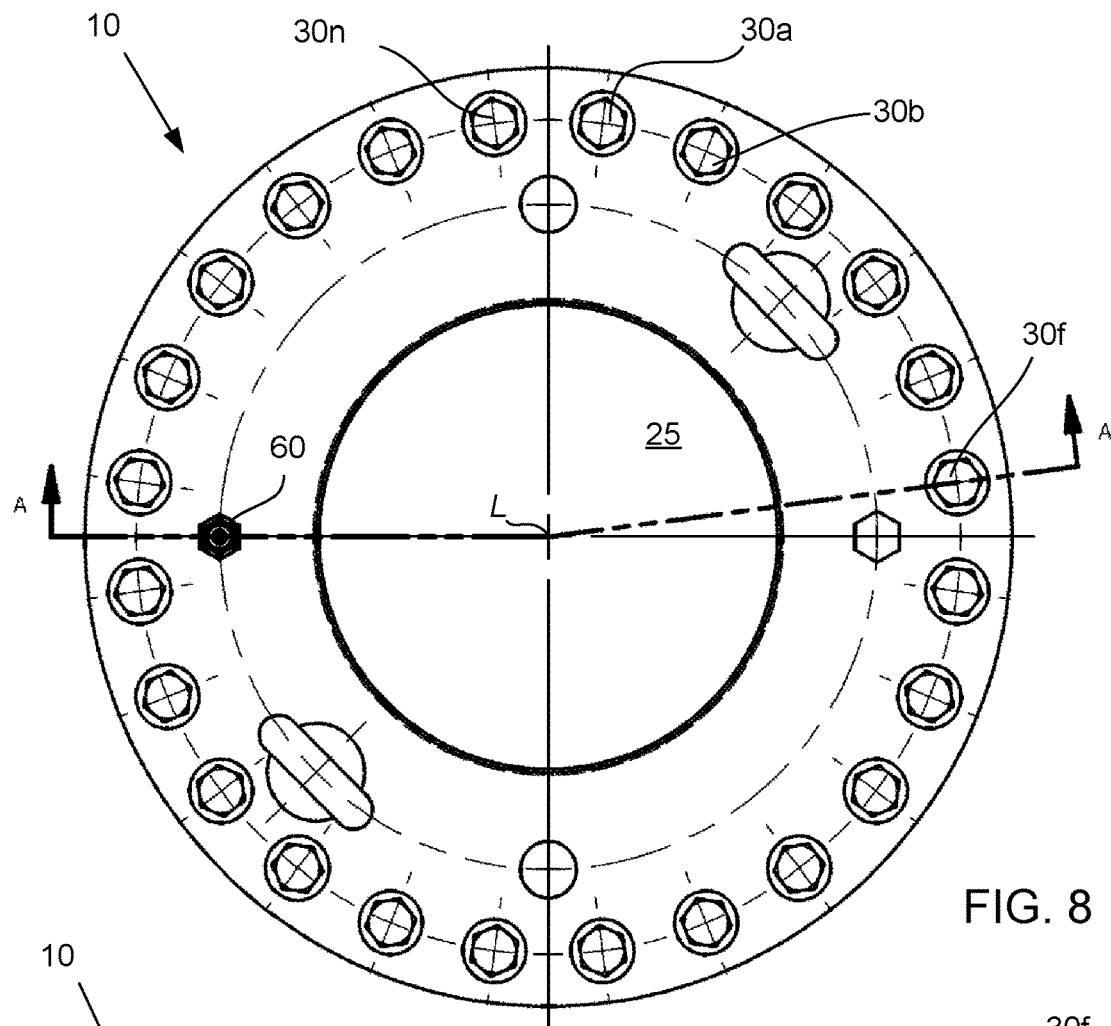
FIG. 8 is a top plan view of the hydraulic MJT of FIG. 7.
Figure 9:
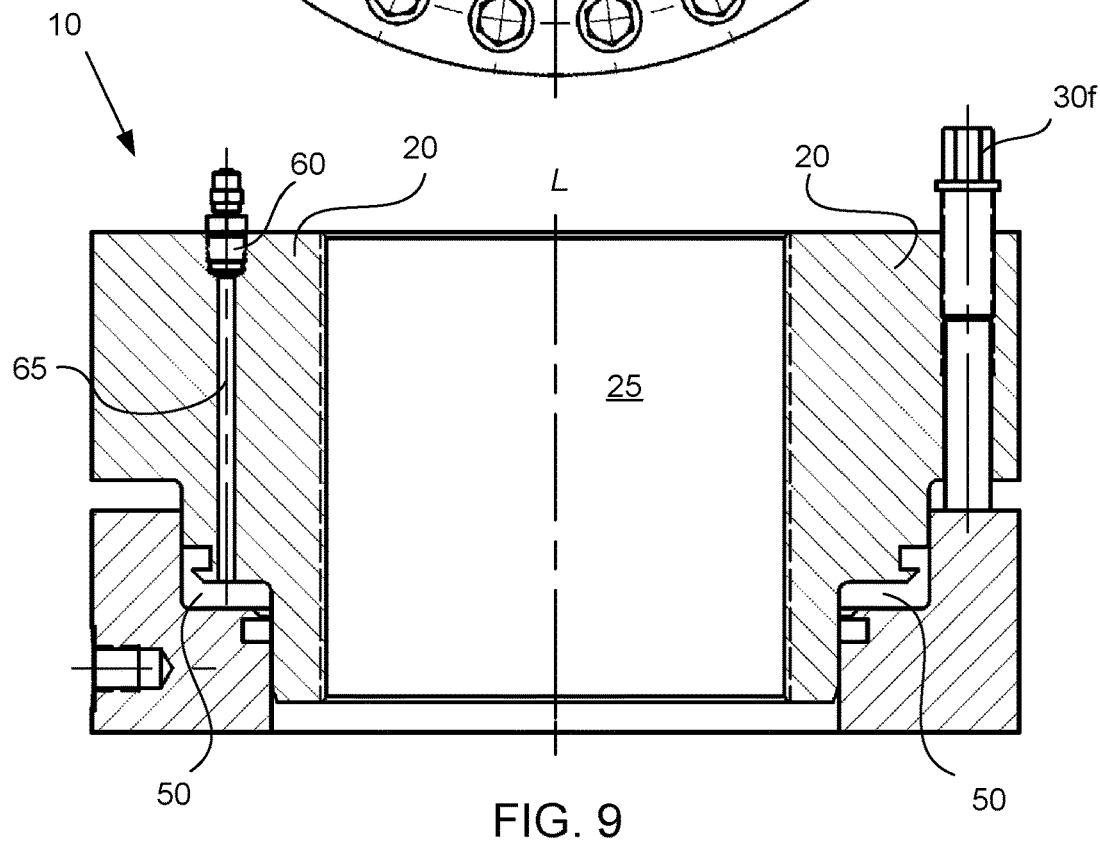
FIG. 9 is a cross sectional view through the line A-A indicated in FIG. 8.

Referring to FIG. 7, there is illustrated in isometric view a MJT 10 according to a first embodiment of the present invention which will be referred to herein as a "hydraulic MJT". FIG. 8 is a plan view of the hydraulic MJT 10 whereas FIG. 9 is a plan view through the section A-A as indicated in FIG. 8.

Figure 1:
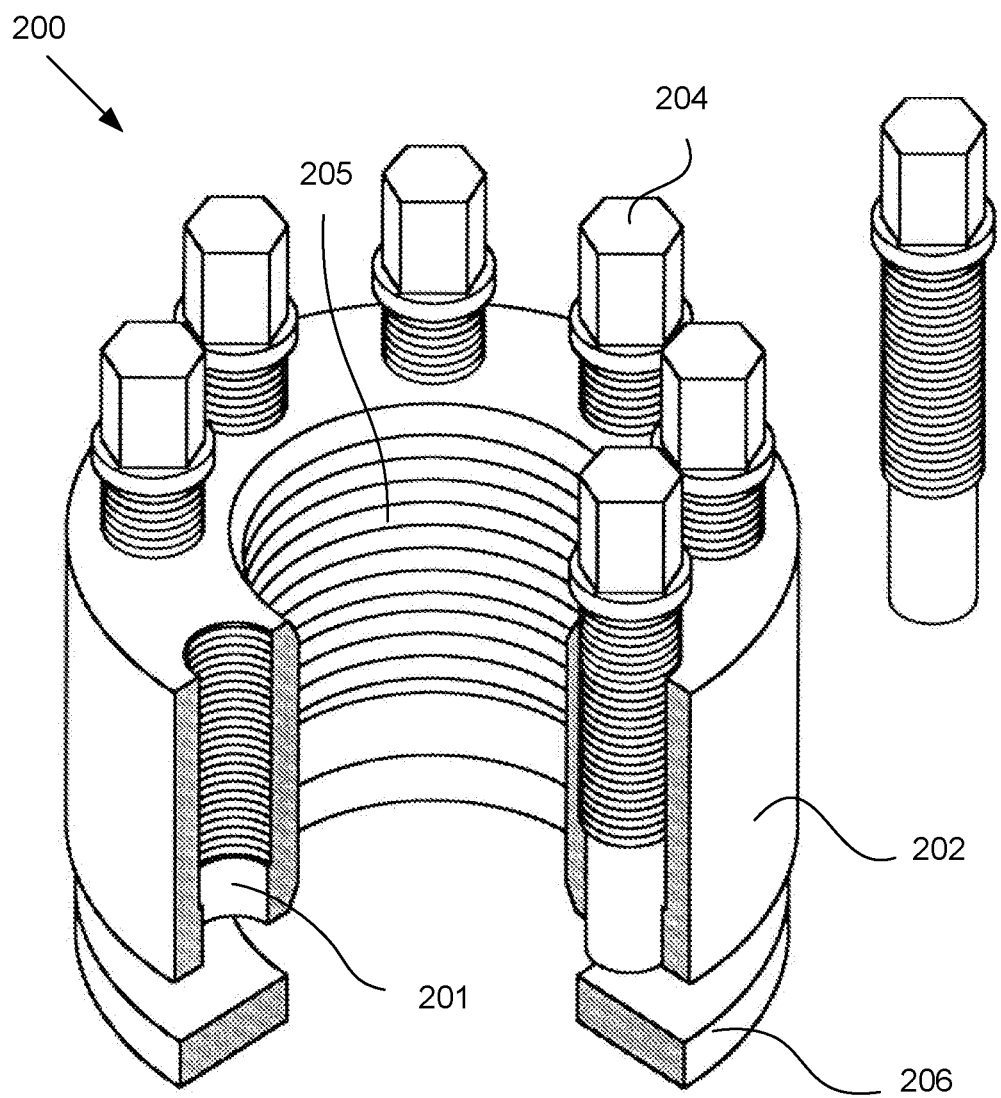
Figure 2:
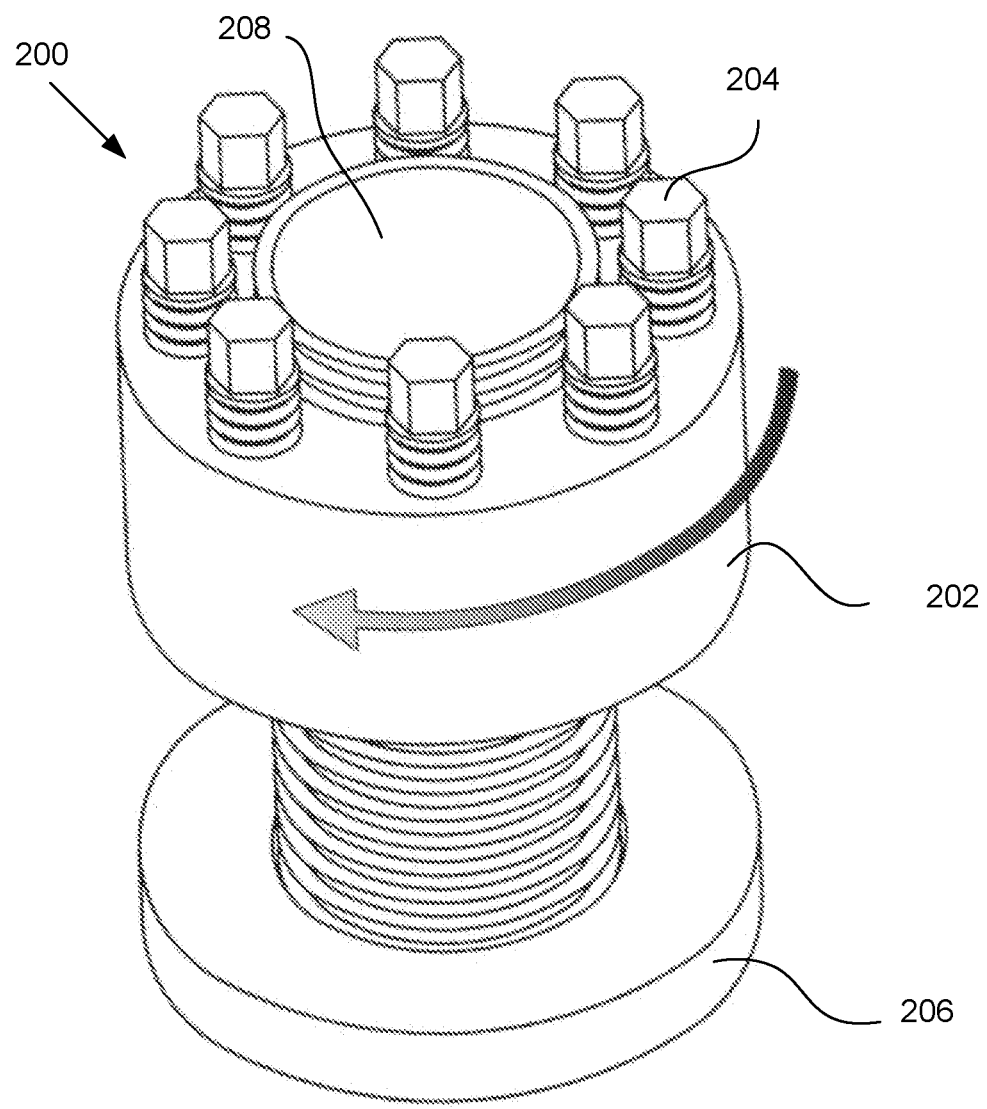
FIGS. 2-6 are a sequence of drawings illustrating the use of the MJT for tensioning a stud or bolt.
Figure 3:
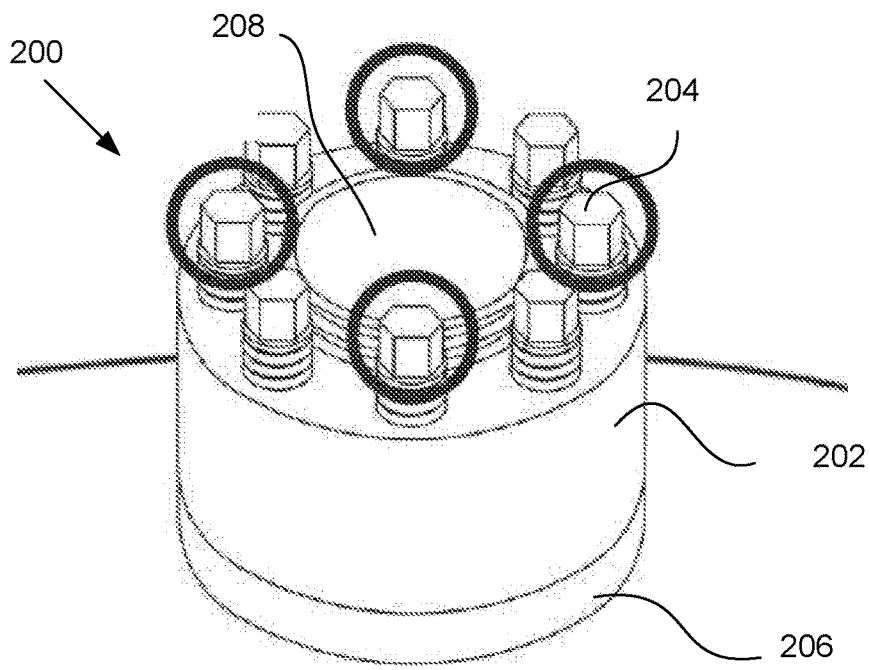
Figure 4:
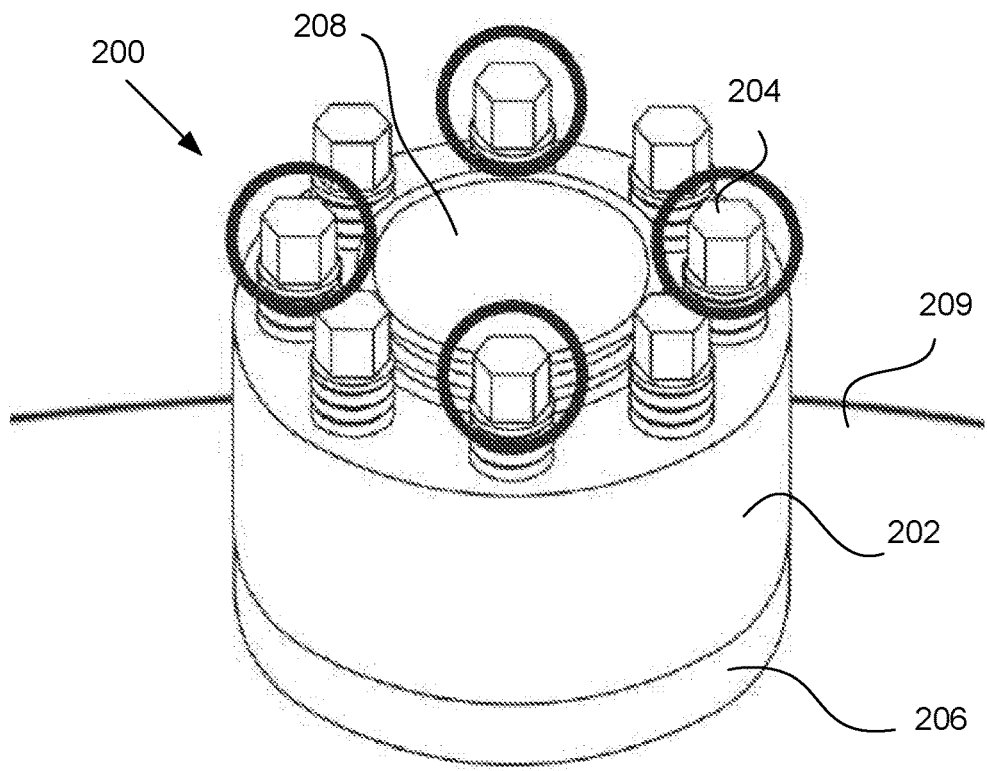
Figure 5:
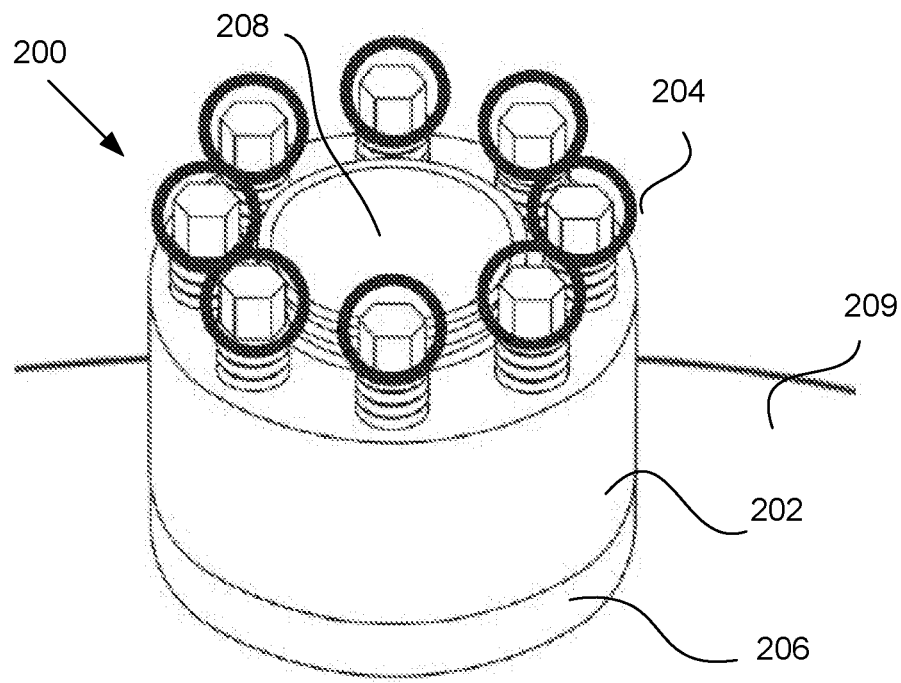
Figure 6:
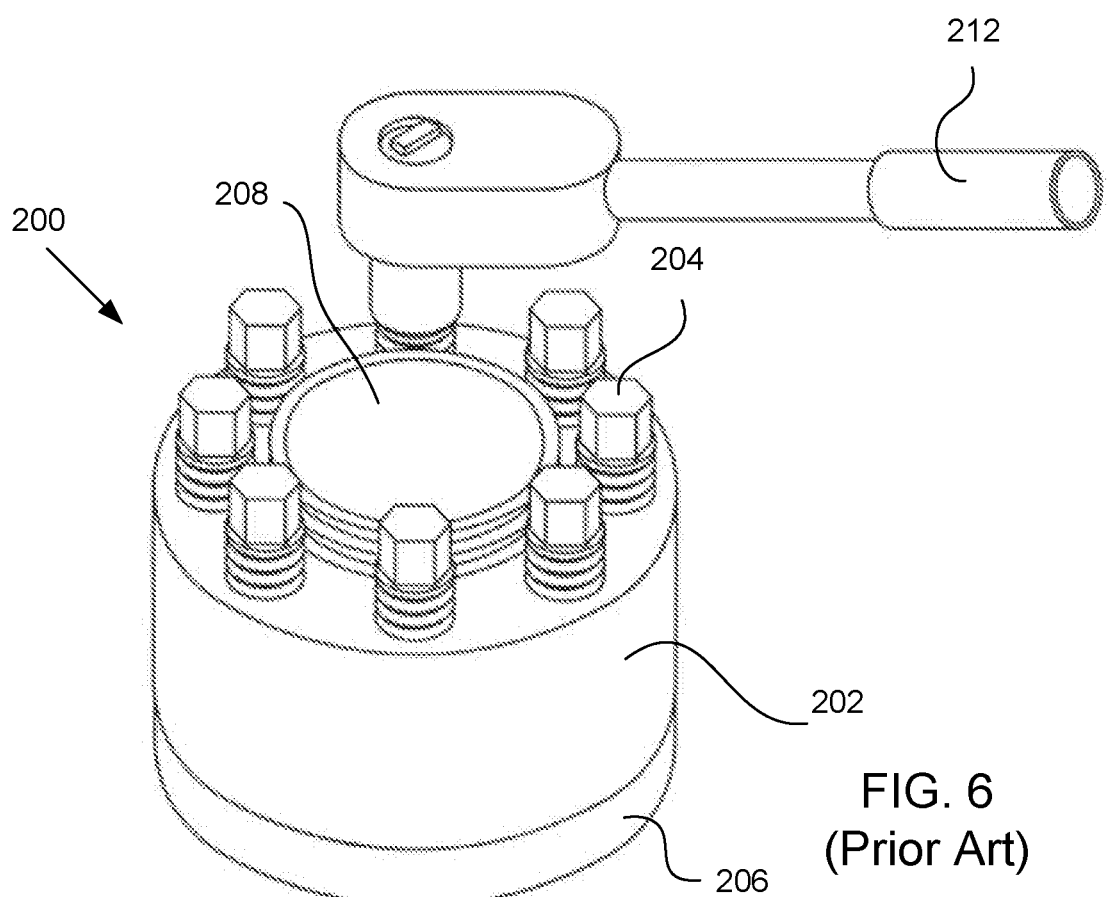

The hydraulic MJT 10 according to this embodiment of the invention is in the form of a nut and generally comprises an annular body 20 with central axis "L" having a concentric circular threaded hole 25 formed therethrough to receive a stud or bolt (not shown). The annular body 20 is formed with a concentric polar array of threaded jack bolt holes therethrough in similar fashions to holes 201 as illustrated in FIG. 1. Through each of the threaded jack bolt holes there passes a corresponding one of a plurality of jack bolts 30a through 30n (which may be generally referred to herein as simply "30" for brevity). The body 20 sits upon a piston 40 which in the present embodiment comprises a load bearing member in that in use it applies force to a workpiece to be fastened, such as a pipe flange for example. In some situations the piston may apply the force to the workpiece via an intermediate member such as a washer. With reference to FIG. 9, the body 20 and the piston 40 are shaped so that they cooperate to define an annular pressure chamber 50 therebetween. The pressure chamber 50 is in fluid communication via a fluid passage 65 with a hydraulic port 60. The port 60 may be positioned on the top outer periphery of the body 20 adjacent or proximate to at least one of the jack bolts 30.

Figure 10:
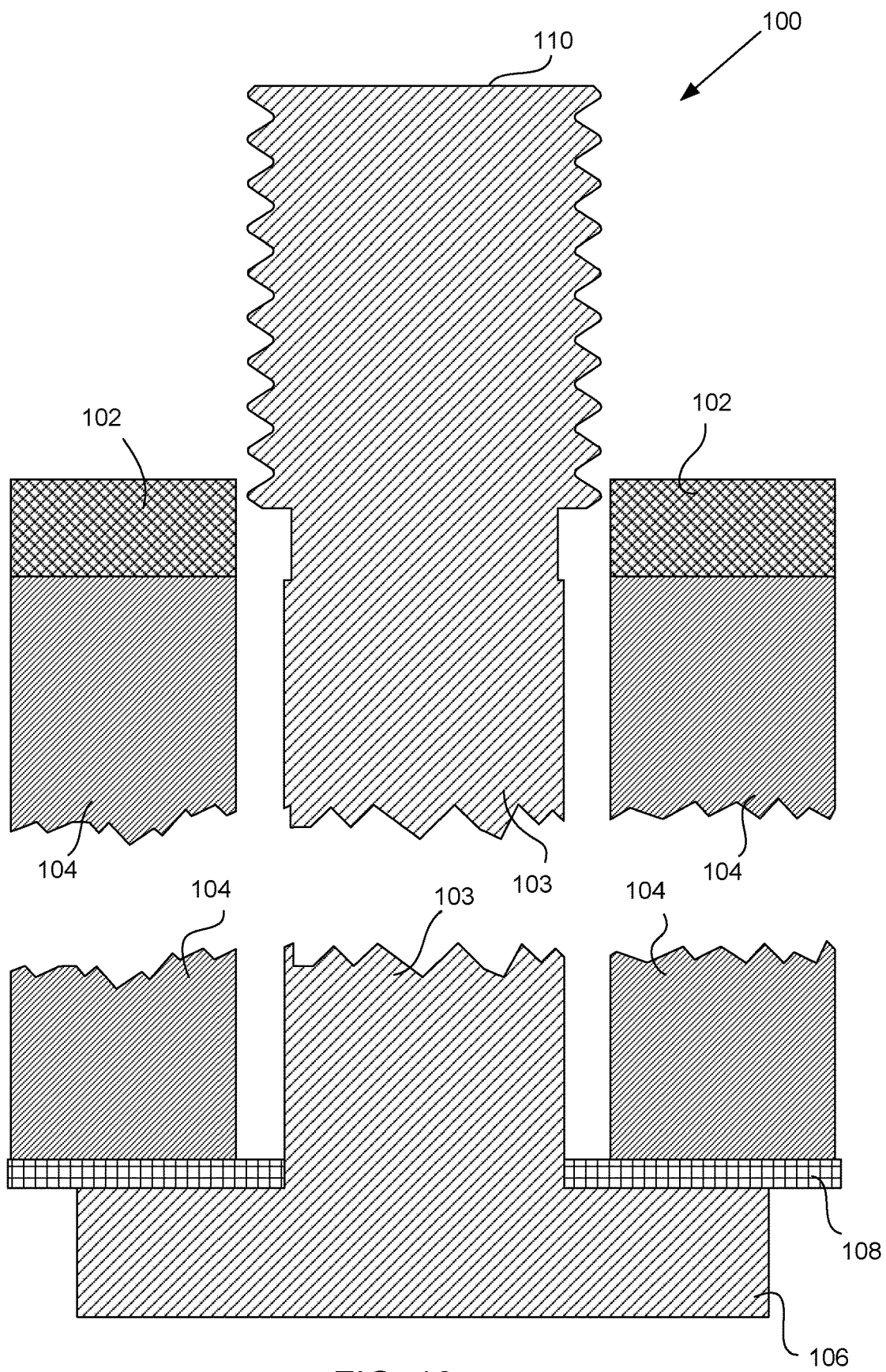

The operation of the hydraulic MJT 10 will now be described with reference to FIGS. 10 to 15. FIG. 10 is a cross sectional side view of a bolt 100 with a shank 103 penetrating first and second workpieces in the form of first and second flanges 102, 104 that are to be fastened together. A bearing surface of the head 106 of the bolt abuts a washer 108 in this example. The washer 108 in turn abuts the outside of the second flange 104. The point 110 of the bolt and much of the thread length of the shank 102 extends out through the second flange 102 for capture by the hydraulic MJT 10 as will be explained.

Figure 11:
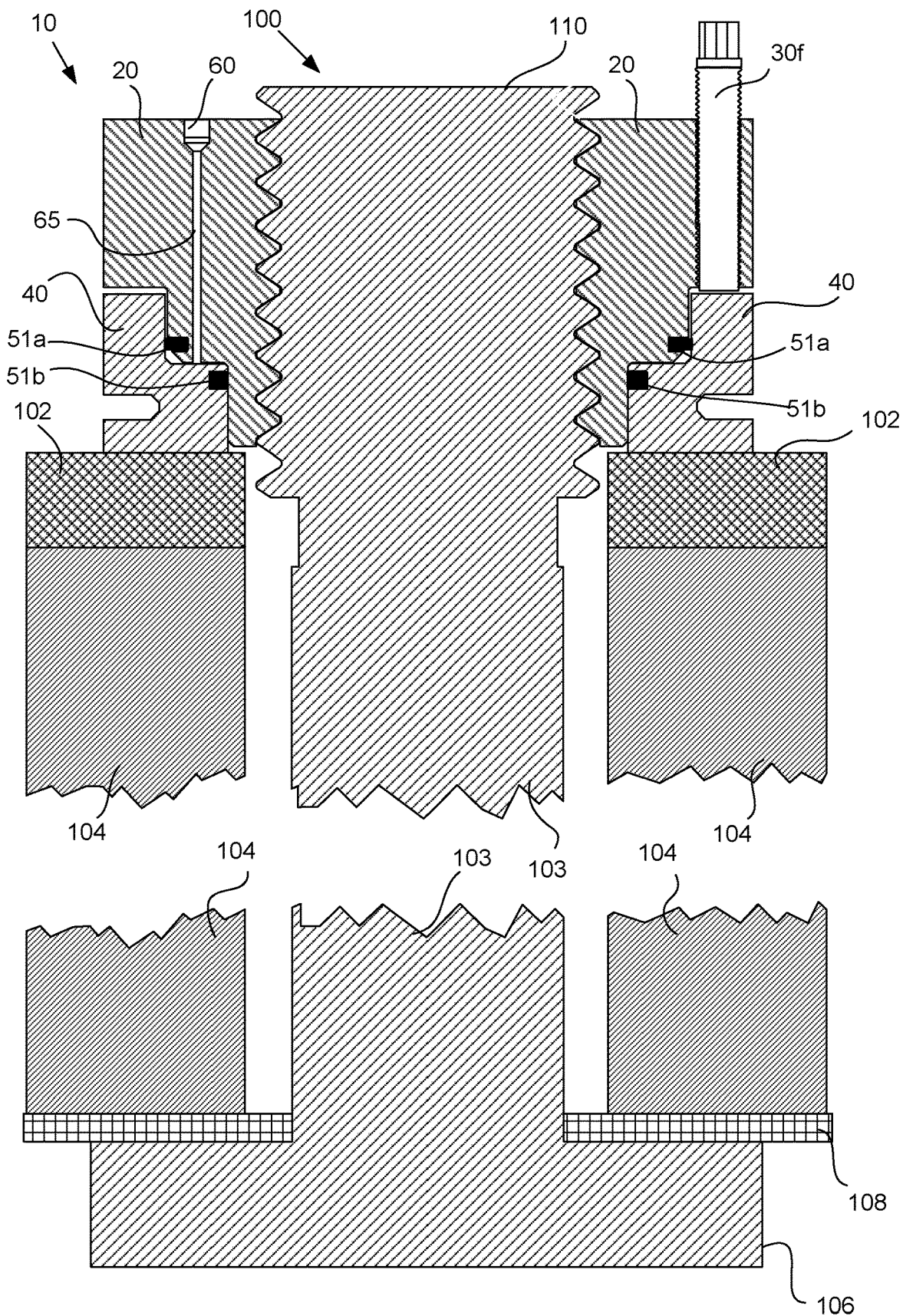

Referring now to FIG. 11, the hydraulic MJT 10 is installed onto bolt 106 by threading the body 20 onto the bolt 100 until the load bearing member in the form of piston 40 seats against the upper, outer, side of the first flange 102. Annular hydraulic seals 51a, 51b are provided to seal the pressure chamber 50. Although not shown, such seals are also present in the embodiments that are described with reference to FIG. 16A onwards.

Returning to FIG. 11, the jack bolts 30 are sufficiently withdrawn so that they do not abut the upper side of the piston 40 and so at this time they exert no force against the piston. In this position the piston 40 and the body 20 are brought close together so that the pressure chamber 50, which is visible in FIG. 9 for example, is vastly reduced in volume.

Figure 12:
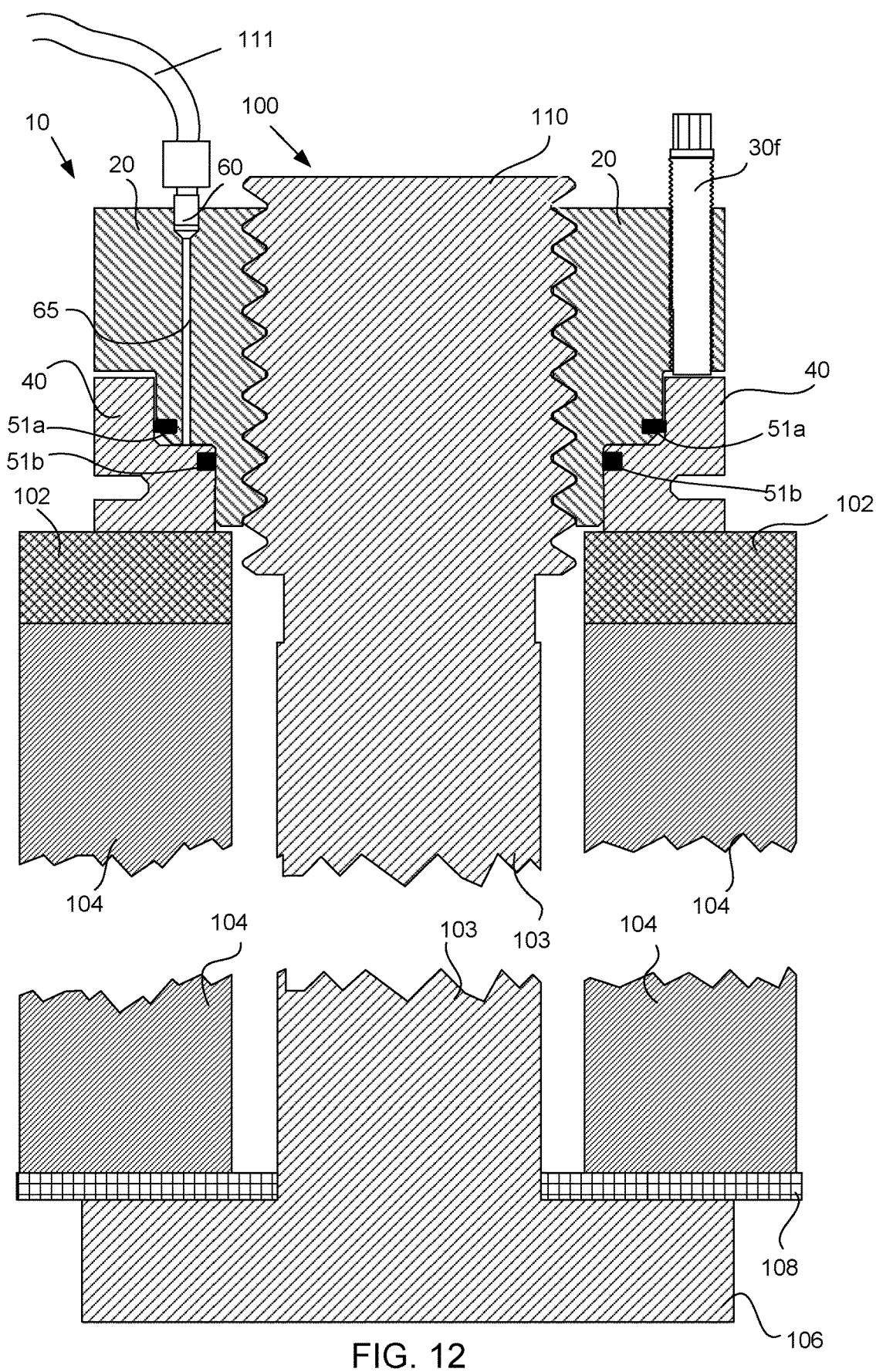
Figure 13:
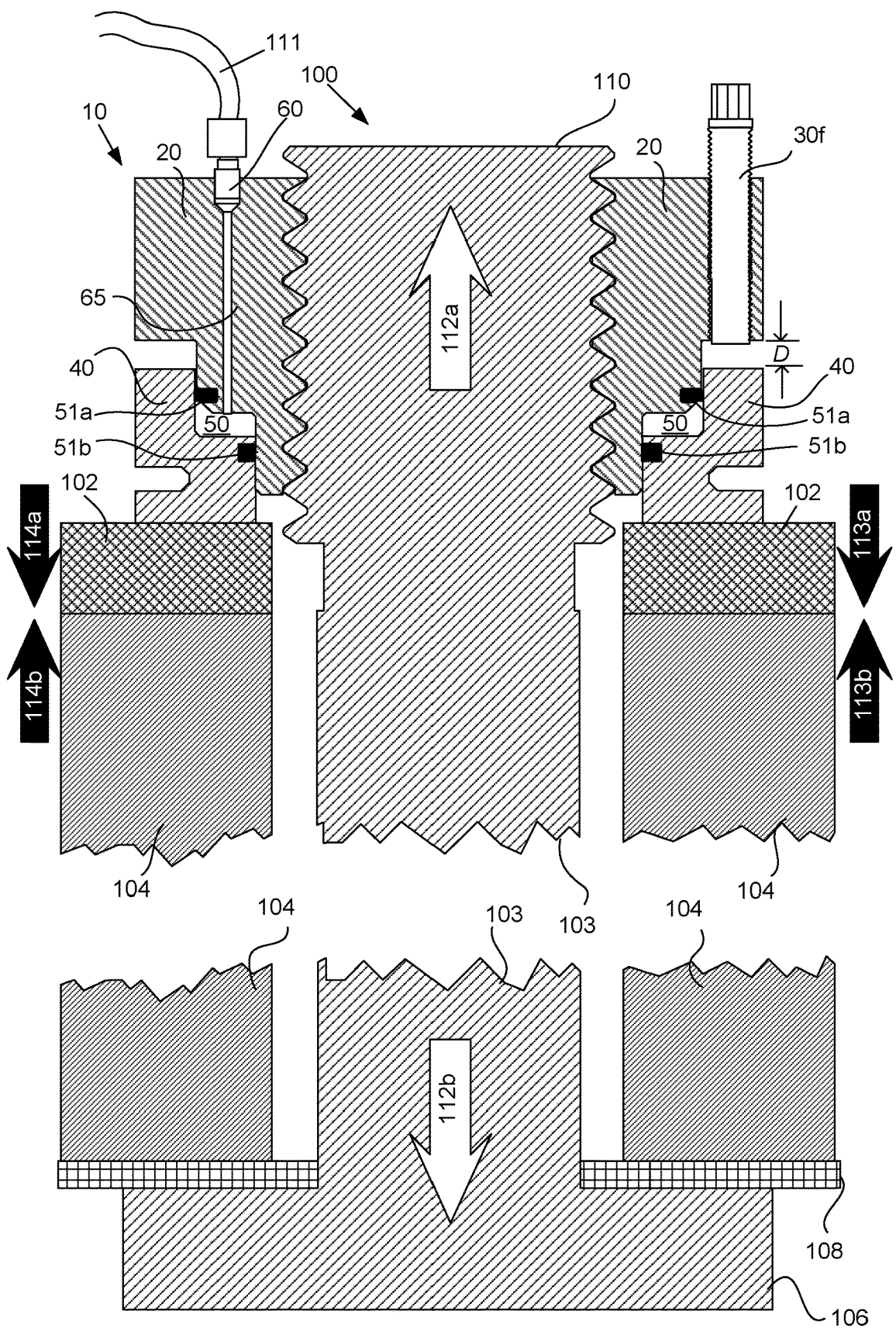

Subsequently, as shown in FIG. 12 a hydraulic line 111 is applied to the hydraulic port 60 using a suitable hydraulic nipple and coupler. The hydraulic line 111 is coupled to a source of hydraulic power. FIG. 13 illustrates how upon applying hydraulic pressure via the line 111 the hydraulic chamber 50 fills with hydraulic fluid thereby forcing the piston 40 apart from the body 20 to a separation distance "D" thereby tensioning the bolt as indicated by arrows 112a, 112b. The underside of the load bearing member, which in the present example comprises piston 40, bears down upon the outside, i.e. the topside as shown in FIG. 13, of the first flange 102.

The separation of the body 20 and the piston 40 results in the generation of an axial load when the hydraulic MJT 10 is mounted to the bolt 100 and the pressure chamber 50 receives hydraulic fluid. The tensioning of the bolt 100 results in compression and/or tightening of the work pieces, e.g. flanges 102 and 104 that are being joined. In the present example illustrated in FIG. 13, this means that the first and second flanges 102 and 104 are tightly compressed together as indicated by arrows 113a, 113b and 114a and 114b. This initial hydraulic pressurization step closes the joint between flanges 102 and 104 quickly. Multiple hydraulic MJTs like MJT 10 may be hydraulically operated simultaneously and from the same source of hydraulic power thereby ensuring uniform, simultaneous joint closure.

Referring now to FIG. 14, whilst application of the hydraulic pressure continues, the jack bolts 30 are each rotated sufficiently to bring their points firmly against the load bearing member, which in the present embodiment comprises piston 40. It is not essential to perform this step on the jack bolts 30 in any particular order because evenly distributed loading between the body and the piston has already been achieved by virtue of the application of the hydraulic pressure.

FIG. 15 illustrates a subsequent stage in which the hydraulic line 111 has been removed. The jack bolts 30 are now torqued, for example with a torque wrench, as indicated by arrow 113 thereby causing the distance between the piston 40 and the body 20 to increase slightly further to D+ΔD as shown in FIG. 15 thereby applying a precise final preload to the bolt 100.

Figure 15A:
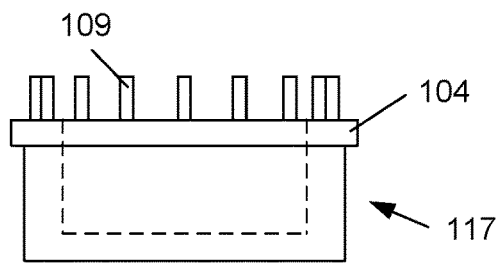
FIGS. 15A-15F illustrate the step by step use of the hydraulic MJT of FIG. 7 to close a vessel having a flanged opening.
Figure 15C:
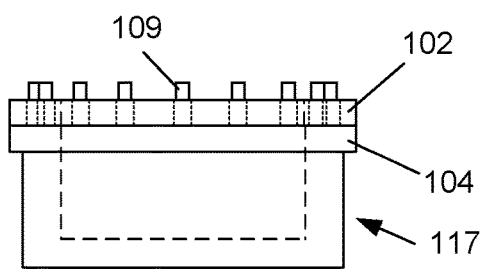
Figure 15B:
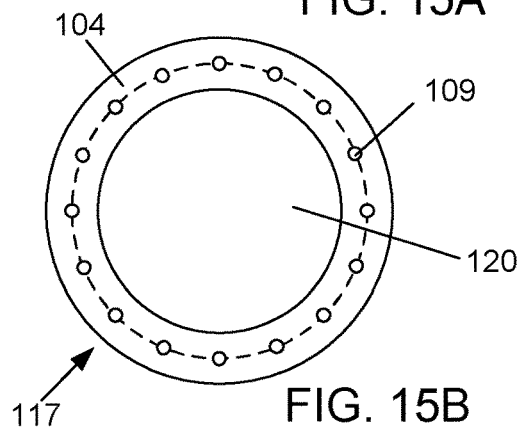
Figure 15D:
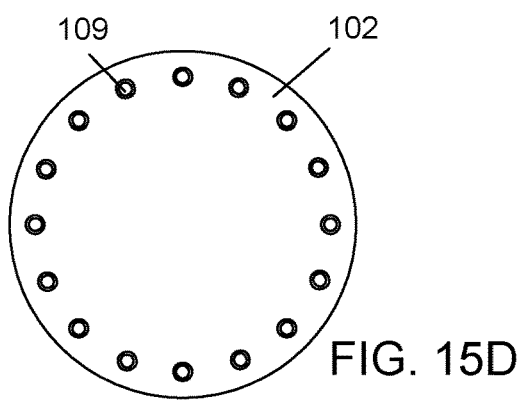
Figure 15E:
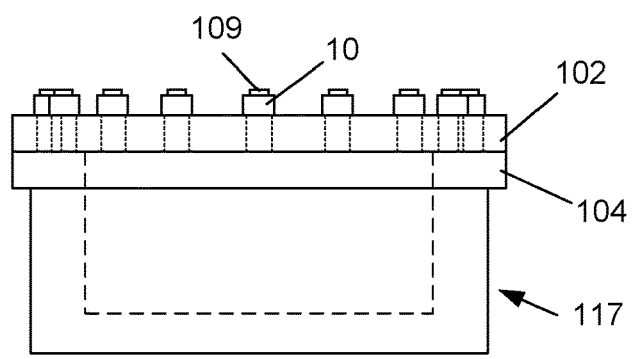
Figure 15F:
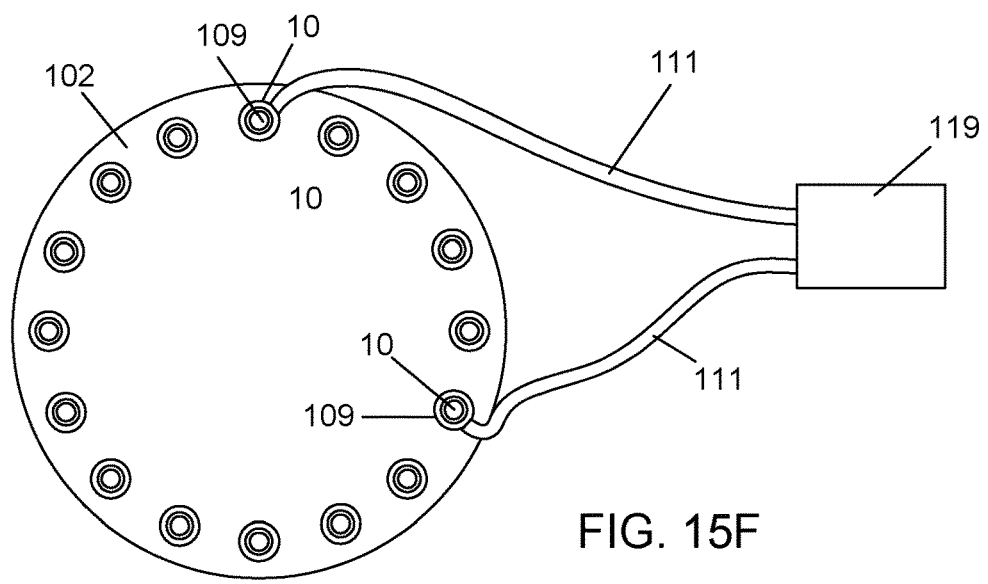

FIGS. 15A to 15F illustrate the use of a plurality of the hydraulic MJTs 10 to fasten a cover 102 over an opening 120 of a vessel 117. FIGS. 15A, 15C and 14E comprise top plan views whereas FIGS. 15B, 15D and 15F comprise corresponding top plan views. As may be seen in FIGS. 15A and 15B, vessel 117 is formed with a flange 104 about opening 120. A plurality of studs 109 are disposed in a polar array around the flange 104 and stand proud therefrom. The cover 102 is formed with holes therethrough corresponding to the studs 109. As shown in FIGS. 15C and 15D a cover 102, formed with peripheral holes corresponding to studs 109 is placed over flange 104 so that the studs 109 extend through the holes as may be seen in FIG. 15C. Hydraulic MJTs 10, of the type previously illustrated in FIG. 7 for example are threaded onto each of the studs 109 until hand tight. Hydraulic lines are then attached to inlets 60 of the MJTs 10 in order to convey hydraulic pressure from hydraulic pressure source 119. All or a number of the MJTs 10 may be hydraulically tensioned at once however it is preferable that the MJTs being tensioned are angularly spaced from each other, for example at 120 degrees as shown in the example of FIG. 15F. Once hydraulically tensioned the jackbolts of the MJTs 10 can then be manually torqued.

Referring now to FIGS. 16A, 16B, in a further embodiment of the invention a hydraulic MJT 10' is provided in a bolt-style, rather than the nut-style of the previously discussed embodiment 10. The hydraulic MJT 10' illustrated in FIGS. 16A, 16B comprises a body 20 that is integrally formed with a threaded shaft 27. A plurality of jack bolts 30 are threadedly received through the body 20. Each of the plurality of jack bolts 30 is spaced uniformly from a longitudinal central axis L at spaced apart locations about an outer periphery thereof. A load bearing member in the form of piston 40 is located beneath the body and around the threaded shaft 27. The body 20 and the piston 40 define a pressure chamber 50 therebetween to receive hydraulic fluid from a port 60 via a fluid passage 65. In use the threaded shaft 27 extends through a first workpiece 102 and is captured by a threaded hole in a second workpiece 104. In response to the application of hydraulic pressure via the port 60 to the pressure chamber 50 the body 20 and piston 40 axially separate, i.e. they displace relative to each other so that the load bearing member in the form of piston 40 bears down on the first workpiece 102 to be joined, and so stretches the shaft and generates an axial load indicated by arrows 112a, 112b, when the shaft 27 is threaded into the hole of the second work piece 104. The axial load acts to compress the work pieces being joined as indicated by arrows 114a, 114b and 113a, 113b. The port 60 may be positioned on the top outer periphery of the body 20 adjacent or proximate to at least one of the jack bolts 30.

Figure 17B:
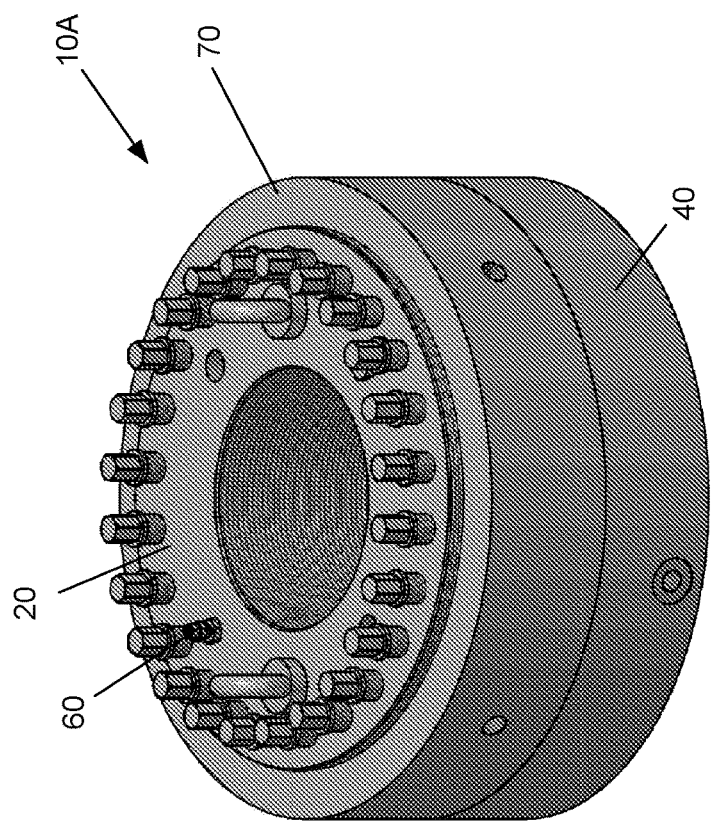
FIGS. 17A-17C illustrate a nut-style hydraulic compression tool with locking ring, according to an embodiment of the present invention.
Figure 17A:
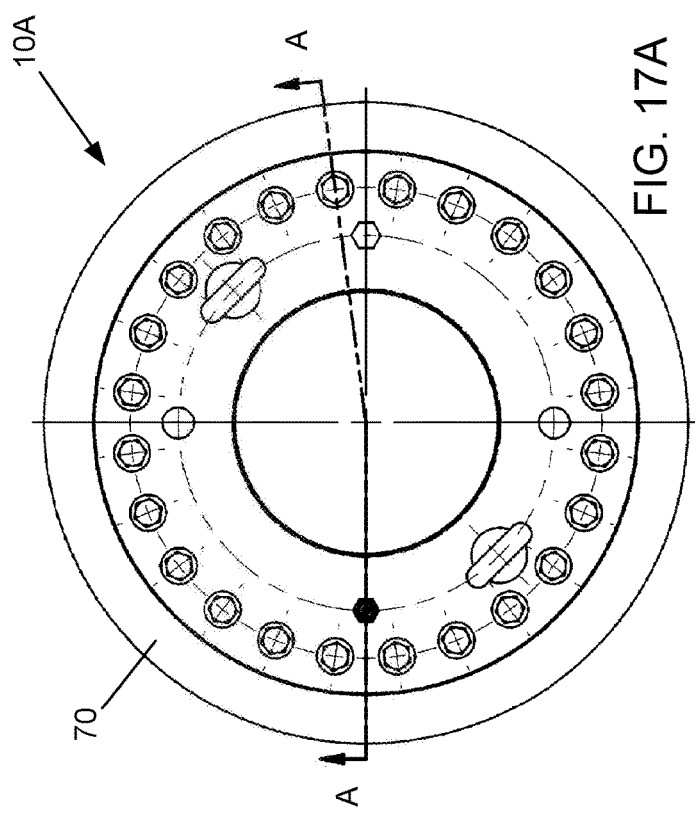
Figure 17C:
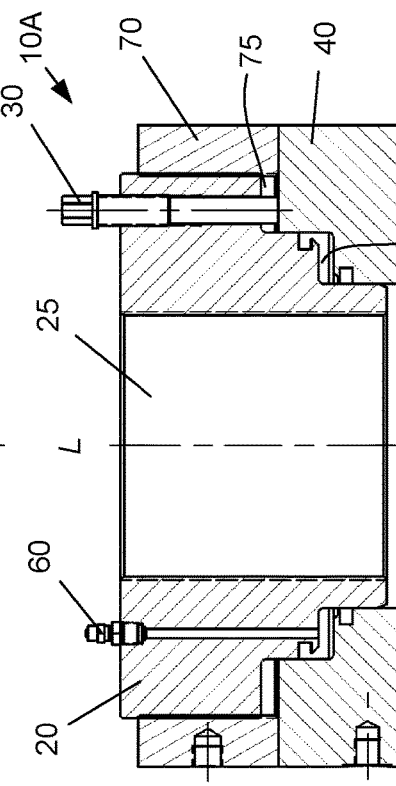
Figure 20B:
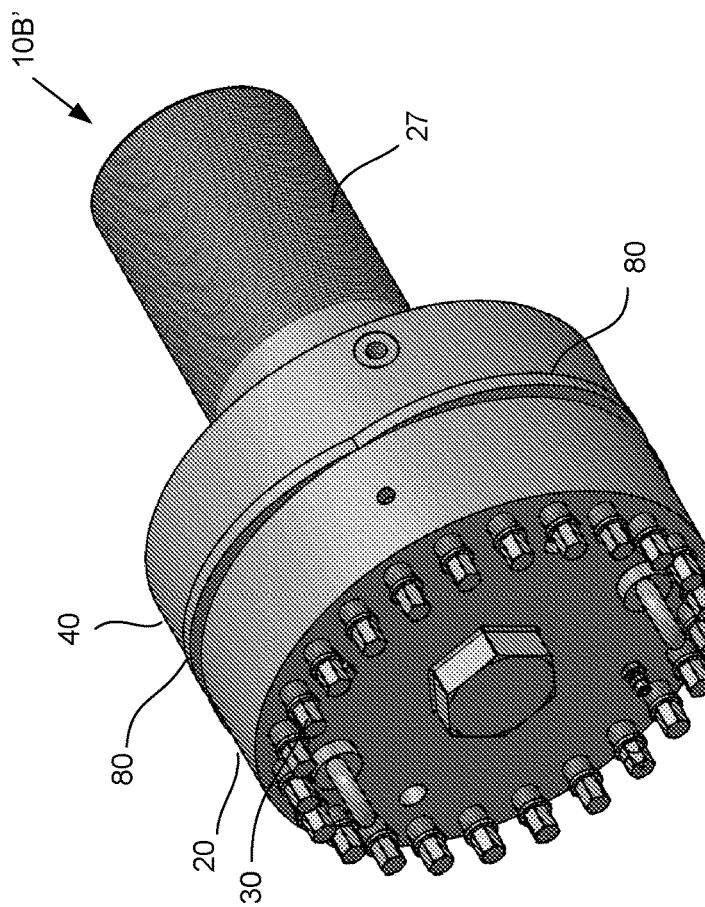
FIGS. 20A and 20B illustrate a bolt-style hydraulic compression tool similar to the tool of FIGS. 19A-19C.
Figure 20A:
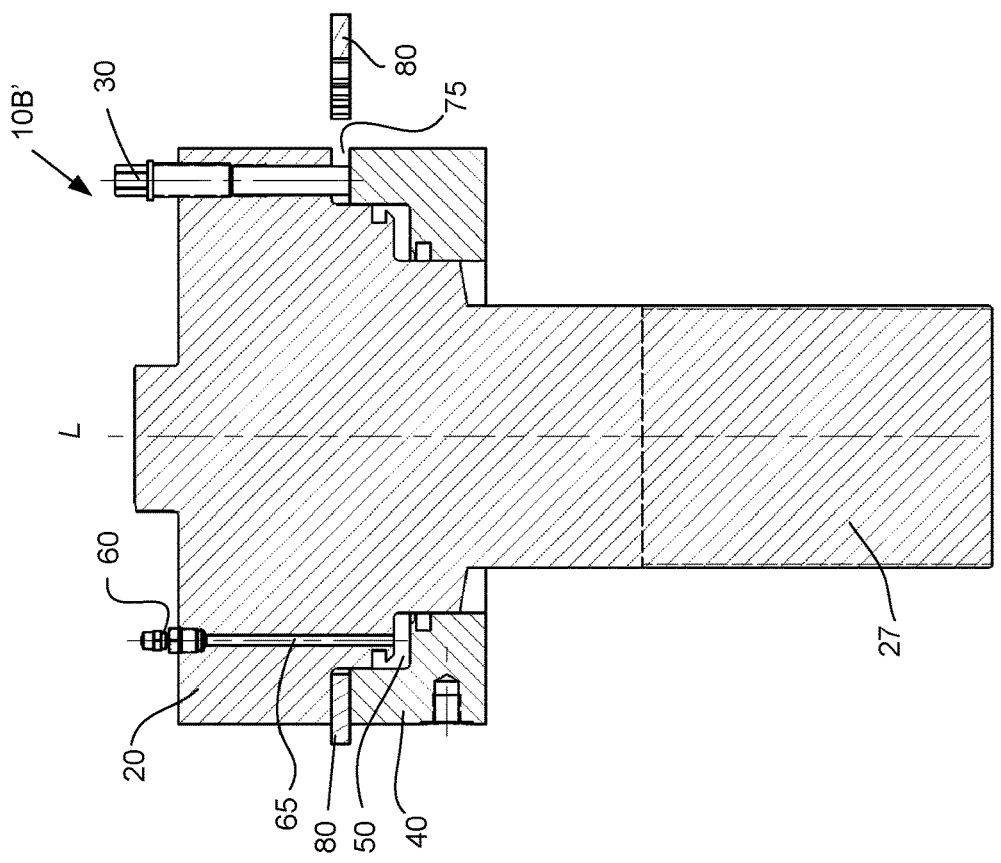

Reference will now be made to FIGS. 17A, 17B and 17C which depict a further nut-style hydraulic MJT fastener 10A and FIGS. 18A, 18B which illustrate a corresponding bolt-style embodiment of a hydraulic MJT fastener 10A'. In these embodiments the hydraulic MJTs 10A, 10A' may comprise an upper locking collar 70. A gap 75 is created between the body 20 and locking collar 70 when the pressure chamber 50 receives hydraulic fluid to generate the pre-load. The body 20 has an outside thread to threadingly engage the locking collar 70. Upon application of hydraulic pressure the piston 40, which in this embodiment comprises the load bearing member against the workpiece to be joined, and the body 20 move apart. The, locking collar 70 is then tightened and the hydraulic pressure may be released to transfer the pre-load to the locking collar 70. The jack bolts 30 are then tightened to further tension the elongate fastener, e.g. shaft 27 or a bolt or stud threadedly received into the axial recess, i.e. central hole 25. Accordingly, the hydraulic pressure may be removed as soon as the locking collar has been tightened and prior to tightening the jackbolts 30.

Referring to FIGS. 19A to 19C and 20A, 20B, in further embodiments, respectively nut-style MJT 10B and bolt style MJT 10B' are provided wherein the hydraulic compression tool 10 includes at least one shim 80. A shim gap 75 is created between the body 20 and piston 40 when the pressure chamber 50 receives hydraulic fluid to generate the pre-load. As shown in FIGS. 19A to 20B, four shims 80 may be used to completely fill the shim gap 75. The shims 80 are shaped to accommodate the jack bolts 30 extending through the body 20. The shims 80 in this example are formed with C-shaped indents 85 having diameters related to the diameter of the jack bolt 30 associated with the indent 85.

Figure 24B:
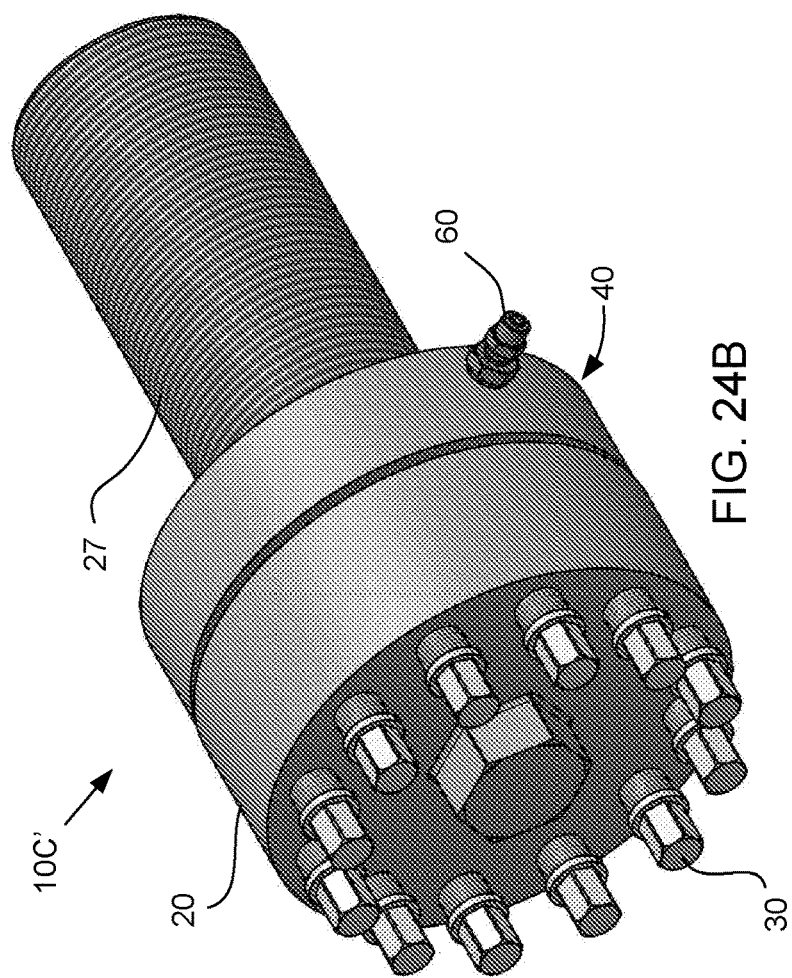
Figure 24A:
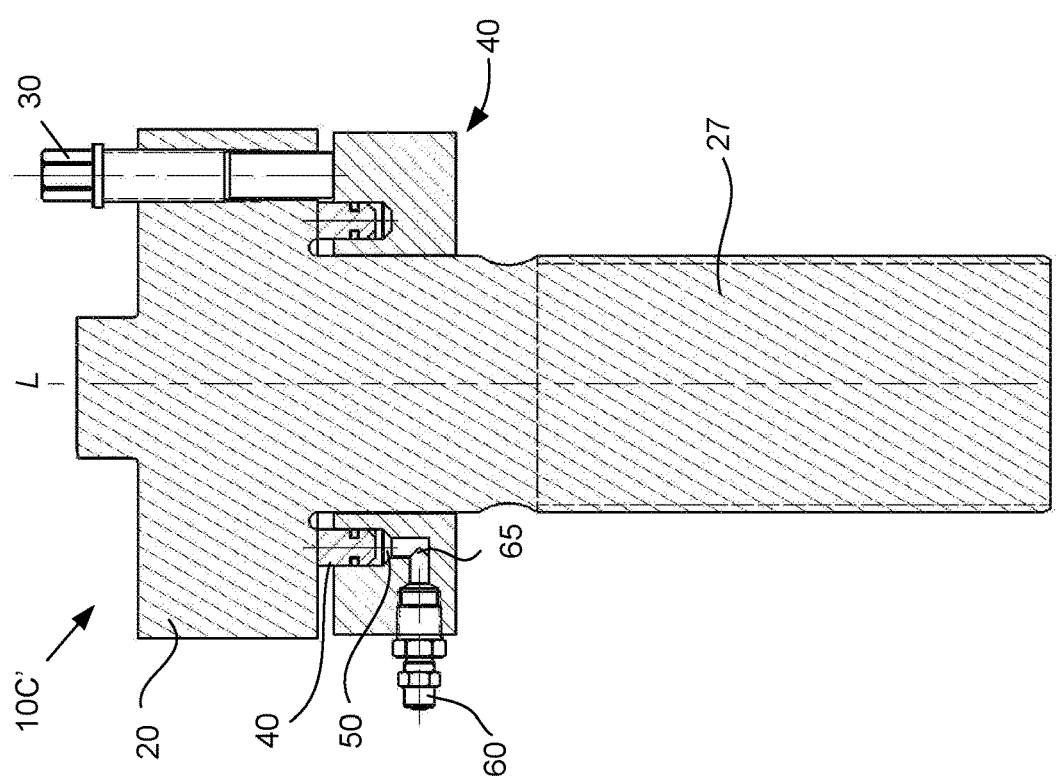

FIGS. 21A-21B, FIGS. 22A-22C and FIGS. 23A-23C illustrate further embodiment 10C, 10D and 10E of a nut-style hydraulic MJT. FIGS. 24A, 24B; 25A, 25B; 26A, 26B illustrate corresponding bolt style MJTs 10C', 10D' and 10E' respectively. In these embodiments a load cell 90 may be incorporated as shown. The load cell comprises the load bearing member that bears upon a workpiece to be fastened in use. The hydraulic MJTs 10C, 10D and 10E comprise an annular body 20 having a annular recess 25 to receive a stud (not shown), and a plurality of jack bolts 30 spaced uniformly from a longitudinal central axis L at spaced apart locations about an outer periphery thereof. At least one piston 40 is slidingly received into the load cell 90 to define a pressure chamber 50 therebetween to receive hydraulic fluid through a port 60 and a fluid passage 65, wherein the body 20 and load cell 90 axially separate to generate an axial load when the tool 10 is mounted to the stud and the pressure chamber 50 receives hydraulic fluid, and wherein the port 60 is positioned on the side outer periphery of the load cell 90 along a plane perpendicular to the longitudinal central axis L that does not intersect any jack bolt 30. The MJT 10D includes a locking ring 70 for holding the body 20 from the load cell 90 subsequent to hydraulic pressure being removed and prior to torquing of the jackbolts 30 whereas the MJT 10E makes use of shims 80 for a similar purpose. The MJTs 10C', 10D' and 10E' are bolt-style embodiments and so an elongate fastener in the form of shaft 27 is integrally formed with the body 20. In operation the axial load compresses the work pieces being joined. In the embodiments 10C to 10E' piston 40 engages a bottom face of the body 20 and in these embodiments the support surface is provided by the underside of the load cell 90 which acts as the load bearing member against a workpiece to be fastened.

Figure 27B:
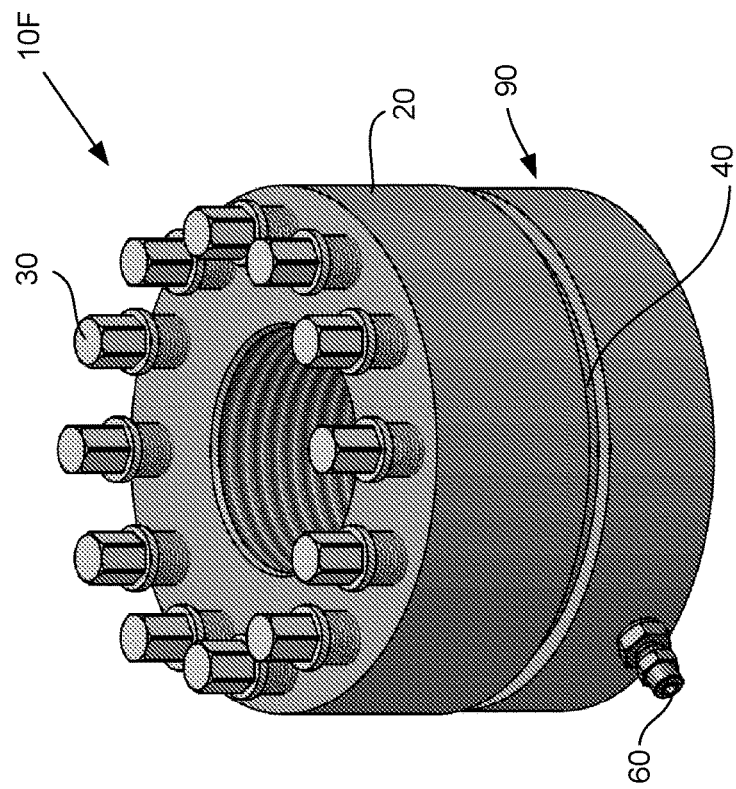
FIGS. 27A-29B illustrate nut-style hydraulic compression tools with a further load cell according to embodiments of the present invention.
Figure 27A:
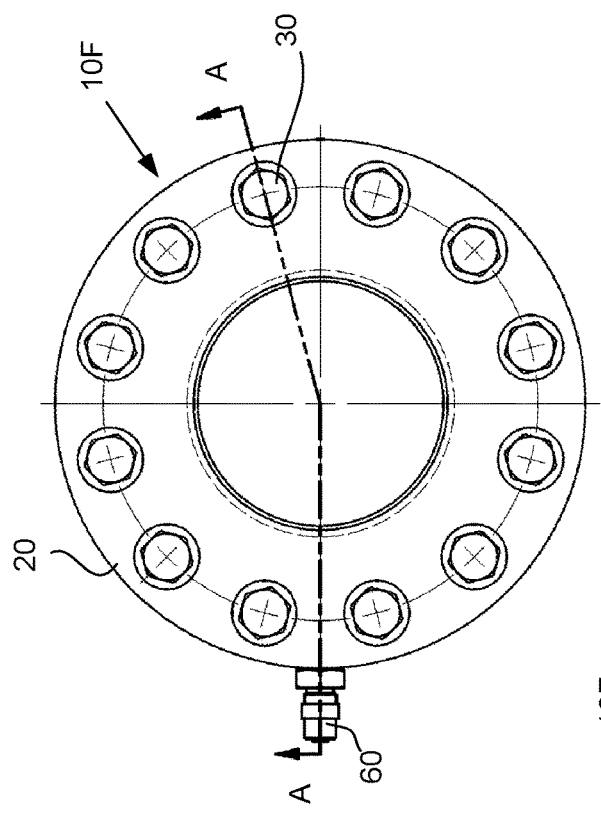
Figure 27C:
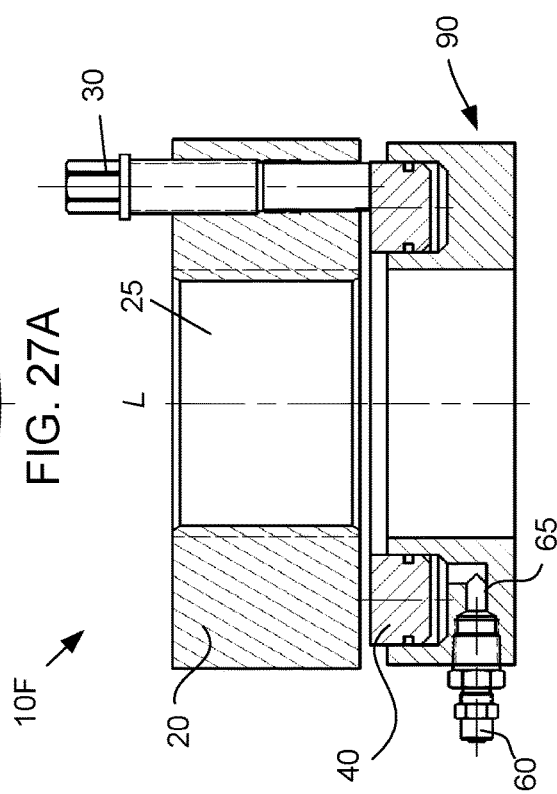
Figure 28B:
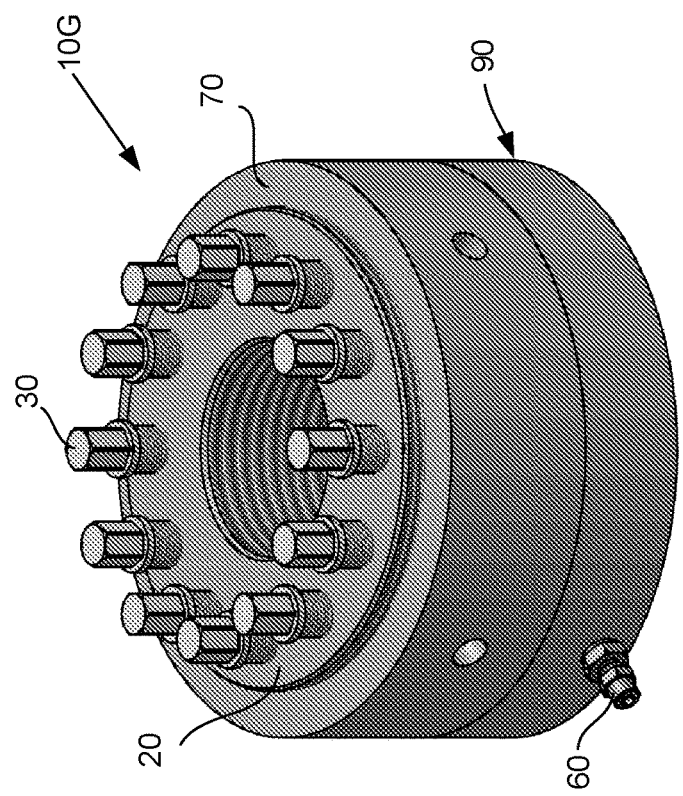
Figure 28A:
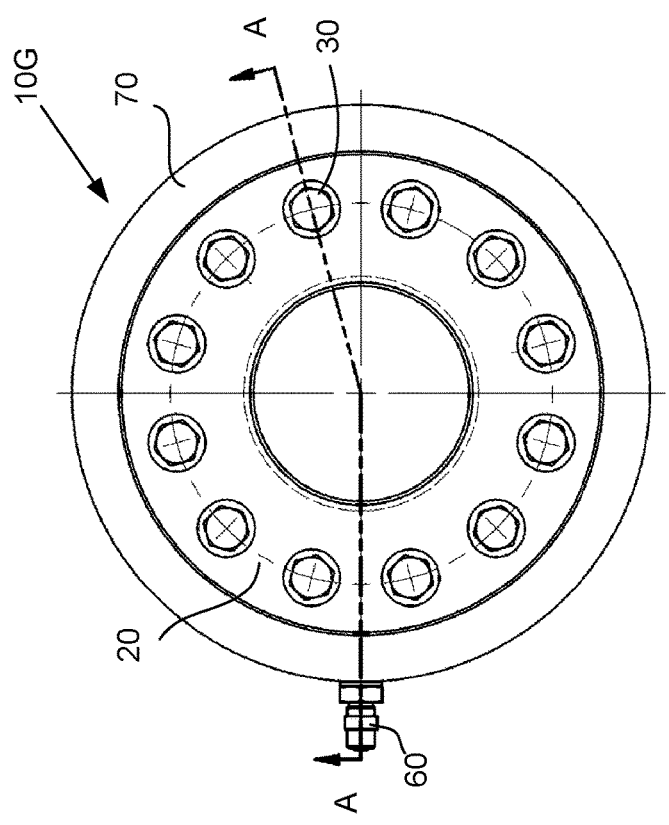
Figure 28C:
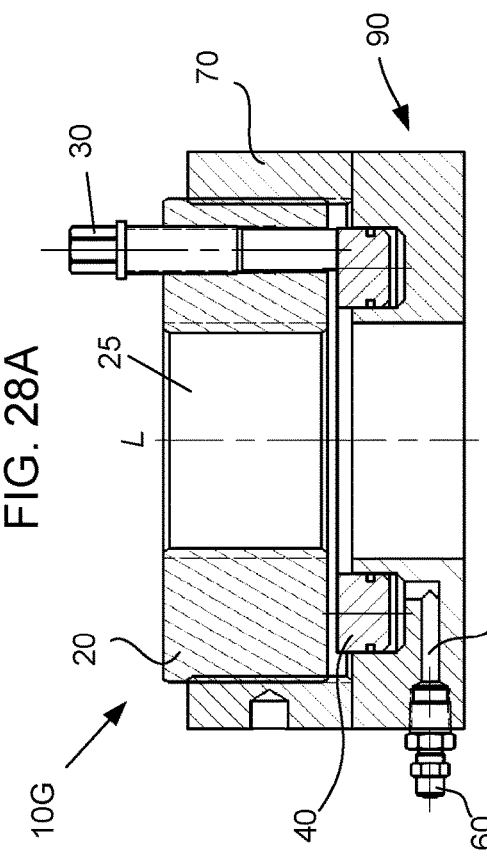
Figure 29B:
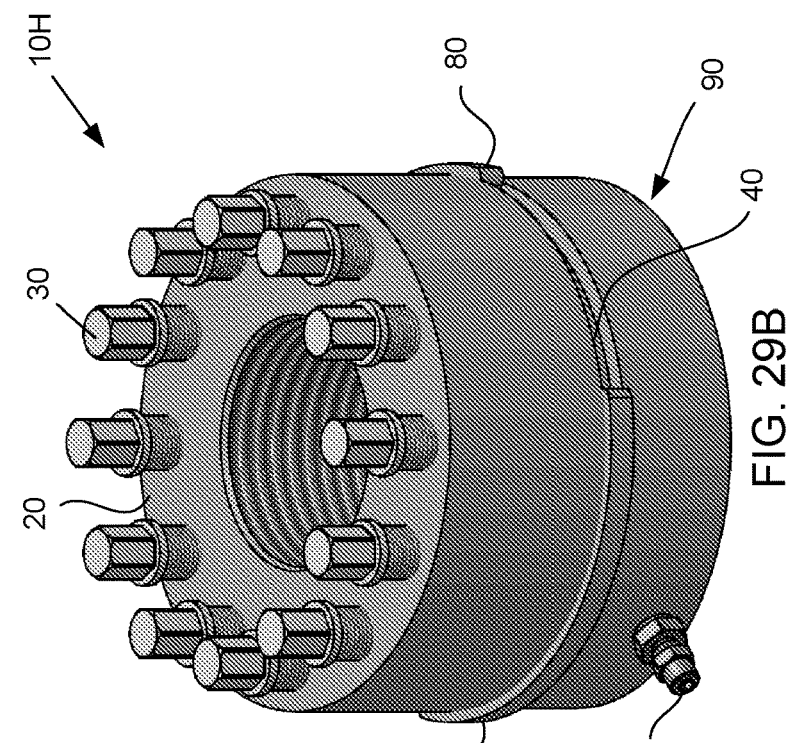
Figure 29A:
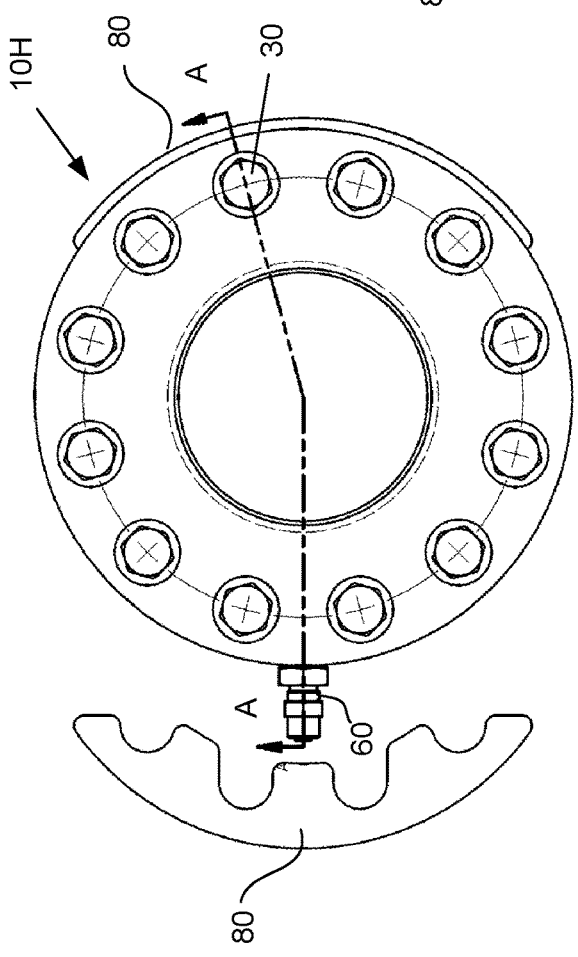
Figure 29C:
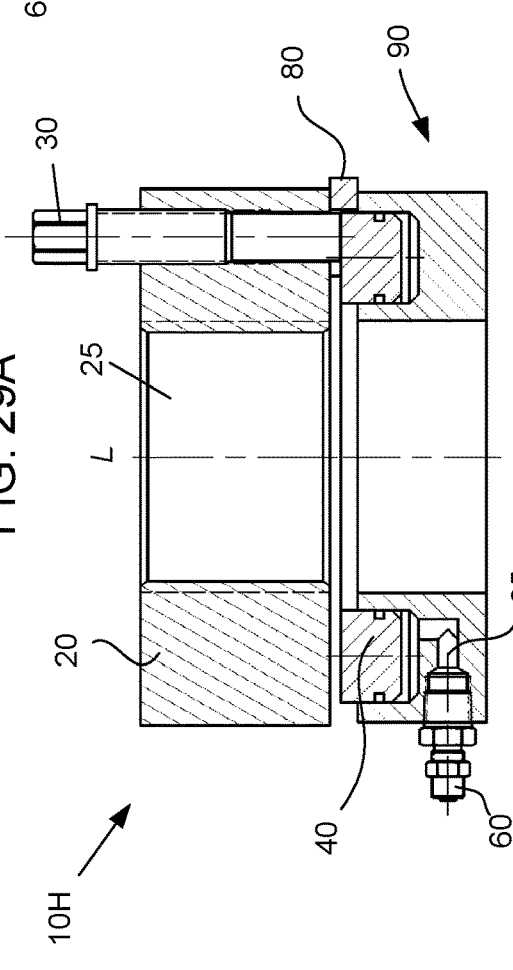

Nut style MJTs 10F, 10G and 10H according to further embodiments of the invention are illustrated in FIGS. 27A-C; 28A-C and 29A-C respectively. In these embodiments of the invention an annular piston 40 is located between body 20 and load cell 90. The piston 40 cooperates with the load cell 90 to define a hydraulic chamber 40. The points of jackbolts 30 are torqued onto the upper surface of the piston 40 in use.

A locking nut 90 is provided in the case of MJT 10G whereas shims 80 are provided in the case of MJT 10H. In both cases the locking nut 90 and shims 10 are provided to maintain the distance between the body 20 and the load cell 90 subsequent to removal of hydraulic pressure and prior to torquing of the jackbolts 30.

Bolt style MJTs 10F', 10G', and 10H', are illustrated in FIGS. 30A, 30B; 31A, 31B and 32A, 32B respectively which correspond to the nut style MJTs 10F, 10G and 10H.

FIGS. 33A-33C depict a further embodiment of a nut-style hydraulic compression tool MJT 10I according to an embodiment of the present invention. MJT 10I has a two-part annular body 20 with a first inner part 20a having an annular recess 25 to receive a stud (not shown), and a plurality of jack bolts 30 spaced uniformly from a longitudinal central axis L at spaced apart locations about its outer periphery. A second part 20B of the two-part annular body 20 is threaded about the outside of the first part 20A. A load cell 90 locates beneath the outer part 20B of the body 20. A washer 64 locates within the annular load cell 90 concentric with the first part 20A of the annular body 20. The load cell 90 is comprised of at least one piston 40 slidingly received into the load cell 90 to define a pressure chamber 50 therebetween to receive hydraulic fluid through a port 60 and a fluid passage 65. Forcing hydraulic fluid into chamber 50 causes the outer part of the body 20B and hence also the inner part 20A of the body to axially separate from the load cell 90 when the tool MJT 10I is mounted to the stud. Once the MJT 10I has been preloaded with hydraulic pressure the jackbolts 30 may be torqued thereby forcing the washer 64 down onto a workpiece to be fastened. As shown in FIGS. 33A-33C, the port 60 may be positioned on the side outer periphery of the load cell 90 along a plane perpendicular to the longitudinal central axis L that intersects two jack bolts 30. The axial load may compress and/or tighten the work pieces being joined.

FIGS. 34A, 34B depict a nut-style MJT 10J corresponding to the bolt style embodiment 10I that has been discussed.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

As generally used herein, the term "stud" means tension elongated members, such as bolts, studs, and rods that may or may not comprise an integral head and/or threads. The integral head and/or threads may be configured to apply compression forces across a joint to produce a tension load in the stud. The threads may be configured for threaded connection with the hydraulic compression tool.

A person skilled in the art may appreciate that the hydraulic compression tool and components thereof may be made from any appropriate material and may have any size required for a particular application using materials and stress calculations known in the art. The body may comprise metal, such as steel, the pressure chamber may comprise a polymer, and the washer may comprise brass or aluminum.

In one embodiment a hydraulic compression tool to compress work pieces being joined may generally comprise a body having a polar array of jack bolts spaced uniformly from a longitudinal central axis at spaced apart locations about an outer surface thereof, a piston slidingly received into the body to define a pressure chamber therebetween to receive hydraulic fluid through a port and a fluid passage, wherein the body and piston axially separate when the pressure chamber receives hydraulic fluid. The body may comprise an annular recess for receiving a stud. The annular recess may comprise threads formed on its inside surface for threaded engagement with the stud. The annular recess may lack threads on its inside surface for engagement with the stud by compression fit. The body may comprise a threaded shaft to engage a hole, such as a threaded hole and a blind hole, in the work piece(s).

The body may comprise drilled and tapped holes to threadedly engage each jack bolt. The jack bolt may comprise a socket-head cap screw. A person having ordinary skill in the art may appreciate that the number of jack bolts may be selected according to the desired stress that is to be imposed on the shank portion of the fastener. The jack bolts may be arranged in only one annular array but two or more annular arrays may be used to accommodate the desired number of jack bolts. For example, the tool may comprise twenty-four jack bolts with twelve jack bolts spaced about each of the bolt centers in an alternating arrangement.

The jack bolt may extend through a tapped hole and project from the body into engagement with a support surface. An end face of the jack bolt may extend into compressive engagement with a support surface. The support surface may comprise the piston, a load cell, or a washer. For example, the support surface may comprise a flange portion of the piston. The washer may be constructed from material having a hardness predetermined according to the forces required to support the tool. The washer may be made from sufficiently hard material, such as metal or plastic, so that the washer may sustain the load imposed thereon by the jack bolt without yielding under the imposed load. The washer may be made from a sufficiently soft material so that the end face of the jack bolt is not upset under the applied load.

The jack bolts may be used to mechanically retain the axial load generated by the hydraulic pressure. The jack bolts may be torqued until the end surface firmly contacts the support surface. Each jack bolt may be rotated until the end face extends from the body to contact the support surface. The jack bolts may be torqued in a patterned sequence such as, for example, by torquing jacks bolts at opposite sides of the body and then advancing to an adjacent jack bolt. A lubricant, such as graphite, may be applied to the threads of the jack bolt to facilitate torquing thereof.

The hydraulic compression tool may comprise a sealing device (not shown), such as a gasket, to substantially fluidly seal the pressure chamber so that hydraulic pressure may be generated. The sealing device may seal any gap between the body and piston. The pressure chamber may be defined by the body, the piston, fluid passage, and sealing device.

The tool may comprise one or more ports. The port may be located on a top surface of the body or piston, such as adjacent or proximate to at least one of the jack bolts, or on a side surface of the body or piston. The port may comprise a standard threaded connection port to permit hydraulic fluid to be supplied to the pressure chamber at elevated pressure and vented therefrom. The port may comprise a one-way valve that threadedly engages the body and/or fluid passage. The one-way valve may prevent or reduce backflow when the pressure source is disconnected from the port.

The pressure source may comprise a high-pressure hand pump that is manually operated.

The body may comprise an opening configured to allow the insertion of a threading tool, such as a tommy bar (not shown), to assist the tensioning of the work piece(s). The opening may be positioned on the top and/or side outer periphery of the body.

A locking collar or shim may be used to mechanically retain the axial load generated by the hydraulic pressure. The locking collar may be torqued while under hydraulic pressure until a face of the locking collar firmly contacts an opposing face of the body and/or piston. The shim may be inserted in the gap between opposing faces of the body and piston that is generated by the hydraulic force. When the hydraulic pressure is released, the load is transferred onto the shims or locking collar to retain the load.

The locking collar may comprise one of a lower collar type and an upper collar type. The hydraulic compression tool may comprise a lower locking collar including a piston having internal threads and external threads. The hydraulic compression tool may comprise an upper locking collar including a piston having internal threads and external threads. The external threads of the piston may engage mating threads of the locking collar. A gap between the body and locking collar may be created when the pressure chamber receives hydraulic fluid to generate the pre-load. The width of the gap may generally relate to the compression of the joint, gasket, if fitted, and the elongation of the stud. The locking collar may be tightened and the pressure may be released to transfer the pre-load to the locking collar.

The hydraulic compression tool may comprise an upper locking collar including a plain bore load cell and a collar nut. The collar nut may comprise internal threads and external threads. The external threads may engage mating threads of the locking collar. A gap between the body and locking collar may be created when the pressure chamber receives hydraulic fluid to generate the pre-load. The width of the gap may generally relate to the compression of the joint, gasket, if fitted, and the elongation of the stud. The locking collar may be tightened and the pressure may be released to transfer the pre-load to the locking collar. The port may be positioned on the side of the piston because the load cell has a plain bore.

The hydraulic compression tool may comprise a shim, and the piston may comprise a flanged piston. A shim gap may be created when the pressure chamber receives hydraulic fluid to generate the pre-load. The width of the gap may generally relate to the compression of the joint, gasket, if fitted, and the elongation of the stud. The width of the shim gap may be measured and a shim having the desired width may be inserted into the shim gap. The shim may comprise one or more shims such that the shims completely fill the shim gap. Each shim may be configured to couple to at least a portion of the jack bolts.

A method of closing a vessel having a plurality of studs may generally comprise threading a hydraulic nut or hydraulic compression tool onto at least one of the plurality of studs of the vessel, and injecting hydraulic fluid into the chamber of the hydraulic nut and/or hydraulic compression tool to tension at least one stud. For example, the method may comprise threading a hydraulic compression tool onto three bolts of the vessel that are spaced 120 degrees apart, and injecting hydraulic fluid into the chamber of each of the or hydraulic compression tools to tension each of the three bolts. MJTs may be positioned adjacent to each of the hydraulic compression tools and tightened to the desired preload. Then, the plurality of jack bolts on each of the hydraulic compression tools may be tightened to the desired preload, and the hydraulic pressure may be released. Alternatively, the hydraulic pressure may be released and the hydraulic compression tools may be replaced by MJTs that are then tightened to the desired preload. The method may also include applying hydraulic compression tools to all of the studs and linking them with hoses to perform a single pass hydraulic closure.

The method may comprise threading a hydraulic compression tool onto each of the bolts of the vessel, wherein each of the hydraulic compression tools are in fluid communication with each other, and injecting hydraulic fluid into the chamber of each of the hydraulic compression tools to tension each of the bolts substantially simultaneously to the same preload. The load generated by the hydraulic compression tools may be evenly distributed around the joint such that a compression gasket may flow into any surface irregularities of the vessel to provide an improved seal relative to tightening the bolts individually. When the desired preload is achieved, the plurality of jack bolts on each of the hydraulic compression tools may be tightened to the desired preload, and the hydraulic pressure may be released.

The method may comprise torquing the hydraulic compression tool onto a bolt of the vessel relatively low torque level prior to introducing hydraulic fluid to the port. For example, the hydraulic compression tool may be threaded onto the bolt until the hydraulic compression tool contacts the surface of the vessel. Then a hydraulic pumping unit may deliver hydraulic fluid, such as high-pressure oil, into the pressure chamber of the hydraulic compression tool. As the hydraulic pressure increases, the resulting axial force elongates the bolt, and thereby may compress the joint. When the desired preload is achieved, the pressure supply may be stopped to release the hydraulic pressure.

Features, integers, characteristics, compounds, chemical moieties or groups described in conjunction with a particular aspect, embodiment or example of the invention are to be understood to be applicable to any other aspect, embodiment or example described herein unless incompatible therewith.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

The invention claimed is:

1. A multi jack tensioner including:
   a body portion formed to engage an elongate fastening member or integrally formed therewith;
   a load bearing member for applying force to a workpiece to be fastened and arranged for location about said elongate fastening member adjacent the body portion;
   a pressure chamber formed between the load bearing member and the body portion arranged to displace the body portion from the load bearing member in response to hydraulic pressure; and
   a plurality of jack bolts extending between the body portion and the load bearing member adapted to displace the body portion from the load bearing member;
   wherein application of hydraulic pressure to the pressure chamber displaces the body portion from the load bearing member for tensioning said elongate fastening member and whereby subsequent tensioning of the elongate fastening member is applied by operation of the plurality of jack bolts,
   wherein the body portion and load bearing member are shaped to cooperate and define the pressure chamber therebetween, and wherein the plurality of jack bolts extend through the body portion to abut the loading bearing member.

2. The multi jack tensioner of claim 1, wherein the body portion is formed with an axial recess to threadedly engage the elongate fastening member wherein the elongate fastening member comprises a bolt or stud.

3. The multi jack tensioner of claim 1 wherein the body portion is integrally formed with the elongate fastening member.

4. The multi jack tensioner of claim 1, wherein the load bearing member is formed as a piston arranged to cooperate with the body portion.

5. The multi jack tensioner of claim 1, wherein the load bearing member is formed as a load cell with which a piston cooperates that forces the body portion in use.

6. The multi jack tensioner of claim 1, wherein the plurality of jack bolts comprises an annular array of jack bolts threadedly received through holes formed spaced uniformly from a longitudinal central axis of the body portion at spaced apart locations about an outer surface thereof.

7. The multi jack tensioner of claim 1, wherein a piston is slidingly received into the body portion, and the pressure chamber between the body portion and piston to receive hydraulic fluid through a port and a fluid passage, wherein when the pressure chamber receives hydraulic fluid, the body portion and piston axially separate.

8. The multi jack tensioner of claim 1, wherein each of the plurality of jack bolts is in threaded engagement with the body portion and projects from the body portion into compressive engagement with the load bearing member.

9. The multi jack tensioner of claim 1, wherein the load bearing member comprises a piston, a load cell, and a washer.

10. The multi jack tensioner of claim 1, wherein the load bearing member comprises a load cell.

11. The multi jack tensioner of claim 1 wherein the loading bearing member comprises a washer.

12. The multi jack tensioner of claim 1 comprising a locking collar for maintaining a distance between the load bearing member and the body portion subsequent to removal of the hydraulic pressure.

13. The multi jack tensioner of claim 1 comprising at least one shim for maintaining a distance between the load bearing member and the body portion subsequent to removal of the hydraulic pressure.

14. The multi jack tensioner of claim 1, wherein a port is positioned on a side outer periphery of a load cell along a plane perpendicular to the longitudinal central axis that does not intersect any jack bolt.

15. The multi jack tensioner of claim 1, wherein a port is positioned on a side outer periphery of a load cell along a plane perpendicular to the longitudinal central axis that intersects two jack bolts.

16. A method for compressing first and second workpieces together comprising the steps of:
   passing an elongate fastening member through the first and second workpieces, wherein a first end of the elongate fastening member is captured on an outer side of the first workpiece, and wherein a second end of the elongate fastening member is captured by a body portion and a load bearing member, wherein a pressure chamber is formed between the load bearing member and the body portion, wherein the body portion and load bearing member are shaped to cooperate and define the pressure chamber therebetween;
   tensioning the elongate fastening member by applying hydraulic pressure to the pressure chamber such that the body portion is displaced from the load bearing member; and
   further tensioning the elongate fastening member by torquing a plurality of jack bolts, wherein the plurality of jack bolts extend between the body portion and the load bearing member, and wherein the plurality of jack bolts extend through the body portion to abut the loading bearing member;
   whereby the tensioning of the elongate fastening member results in compressing the first and second workpieces towards each other.

17. A method of closing a vessel having at least one stud, the method comprising:
   threading a first hydraulic compression tool onto the at least one stud, wherein the first hydraulic compression tool comprises
      a body having a threaded shaft, and a plurality of jack bolts spaced uniformly from a longitudinal central axis at spaced apart locations about an outer periphery thereof,
      a piston slidingly received into the body to form a pressure chamber therebetween to receive hydraulic fluid through a port and a fluid passage, wherein the body and piston are shaped to cooperate and define the pressure chamber therebetween, and wherein the body and piston axially separate when the tool is mounted to the stud and the pressure chamber receives hydraulic fluid;

injecting hydraulic fluid into the chamber to tension the at least one stud; and torqueing the plurality of jack bolts to close the vessel, wherein the plurality of jack bolts extend through the body portion to abut the loading bearing member.

18. The method of claim 17 comprising:

threading a second hydraulic compression tool onto another stud; and simultaneously injecting hydraulic fluid into the pressure chamber of each hydraulic compression tool threaded onto each shaft, wherein each pressure chamber is in fluid communication with other pressure chamber(s) to tension each stud to substantially equal preloads.

19. The method of claim 17 comprising threading at least one multi-jack bolt tensioner to another of the at least one stud adjacent to the hydraulic compression tool threaded onto the at least one stud.

* * * * *